(12) United States Patent
Frey et al.

(10) Patent No.: US 7,756,968 B1
(45) Date of Patent: Jul. 13, 2010

(54) METHOD AND SYSTEM FOR EMPLOYING A HIERARCHICAL MONITOR TREE FOR MONITORING SYSTEM RESOURCES IN A DATA PROCESSING ENVIRONMENT

(75) Inventors: Gregor K. Frey, Lorsch (DE); Joerg Weller, Wieblingen (DE); Juergen Opgenorth, Heidelberg (DE); Reinhold Kautzleben, Karlsruhe (DE); Miroslav R. Petrov, Sofia (BG)

(73) Assignee: SAP AG, Walldorf (DE)

( * ) Notice: Subject to any disclaimer, the term of this patent is extended or adjusted under 35 U.S.C. 154(b) by 1344 days.

(21) Appl. No.: 10/748,774

(22) Filed: Dec. 30, 2003

(51) Int. Cl.
*G06F 15/173* (2006.01)

(52) U.S. Cl. .................. 709/224; 709/223; 709/225; 709/226

(58) Field of Classification Search .................. 709/224
See application file for complete search history.

(56) References Cited

U.S. PATENT DOCUMENTS

| | | | |
|---|---|---|---|
| 5,201,044 A | 4/1993 | Frey et al. | |
| 5,608,720 A | 3/1997 | Biegel et al. | |
| 5,802,291 A | 9/1998 | Balick et al. | |
| 5,944,841 A | 8/1999 | Christie | |
| 6,026,237 A | 2/2000 | Berry et al. | |
| 6,055,492 A | 4/2000 | Alexander, III et al. | |
| 6,061,721 A | 5/2000 | Ismael et al. | |
| 6,061,740 A | 5/2000 | Ferguson et al. | |
| 6,066,181 A | 5/2000 | DeMaster | |
| 6,083,281 A | 7/2000 | Diec et al. | |
| 6,118,940 A | 9/2000 | Alexander, III et al. | |
| 6,134,581 A | 10/2000 | Ismael et al. | |
| 6,144,967 A | 11/2000 | Nock | |
| 6,178,529 B1 | 1/2001 | Short et al. | |
| 6,202,199 B1 | 3/2001 | Wygodny et al. | |
| 6,205,476 B1 | 3/2001 | Hayes, Jr. | |
| 6,212,520 B1 | 4/2001 | Maruyama et al. | |
| 6,230,313 B1 | 5/2001 | Callahan, II et al. | |
| 6,260,187 B1 | 7/2001 | Cirne | |
| 6,272,537 B1 | 8/2001 | Kekic et al. | |
| 6,289,506 B1 | 9/2001 | Kwong et al. | |

(Continued)

FOREIGN PATENT DOCUMENTS

JP     2001195151    7/2001

(Continued)

OTHER PUBLICATIONS

""EarlyAdopter_DS.pdf, Bibliographic Data for Early Adopter: J2SE 1.4"", *by Wrox Press* 1 pg.

(Continued)

*Primary Examiner*—Jeffrey Pwu
*Assistant Examiner*—Abdelnabi O Musa
(74) *Attorney, Agent, or Firm*—Blakely Sokoloff Taylor & Zafman

(57) ABSTRACT

A method, apparatus, and system are provided for monitoring of system resources using a monitor tree. According to one embodiment, a resource may be associated with a monitor managed bean at a node of a monitor tree. Monitoring information regarding the associated resources may be requested from a runtime managed bean, and the monitoring information may be received by the monitor managed bean at the node of the monitor tree.

26 Claims, 19 Drawing Sheets

U.S. PATENT DOCUMENTS

| | | | |
|---|---|---|---|
| 6,308,208 B1 * | 10/2001 | Jung et al. | 709/224 |
| 6,351,776 B1 | 2/2002 | O'Brien et al. | |
| 6,356,931 B2 | 3/2002 | Ismael et al. | |
| 6,381,735 B1 | 4/2002 | Hunt | |
| 6,389,464 B1 | 5/2002 | Krishnamurthy et al. | |
| 6,427,228 B1 | 7/2002 | Wigger | |
| 6,463,454 B1 | 10/2002 | Lumelsky et al. | |
| 6,466,973 B2 | 10/2002 | Jaffe | |
| 6,470,388 B1 | 10/2002 | Niemi et al. | |
| 6,539,501 B1 | 3/2003 | Edwards | |
| 6,553,403 B1 | 4/2003 | Jarriel et al. | |
| 6,567,809 B2 | 5/2003 | Santosuosso | |
| 6,591,228 B1 | 7/2003 | Hall et al. | |
| 6,631,515 B1 | 10/2003 | Berstis | |
| 6,658,600 B1 | 12/2003 | Hogdal et al. | |
| 6,662,359 B1 | 12/2003 | Berry et al. | |
| 6,664,978 B1 | 12/2003 | Kekic et al. | |
| 6,681,232 B1 | 1/2004 | Sistanizadeh | |
| 6,708,173 B1 | 3/2004 | Behr et al. | |
| 6,738,933 B2 | 5/2004 | Fraenkel et al. | |
| 6,742,178 B1 | 5/2004 | Berry et al. | |
| 6,754,890 B1 | 6/2004 | Berry et al. | |
| 6,772,178 B2 | 8/2004 | Mandal et al. | |
| 6,788,315 B1 * | 9/2004 | Kekic et al. | 715/733 |
| 6,789,257 B1 | 9/2004 | MacPhail | |
| 6,792,456 B1 | 9/2004 | Hellerstein et al. | |
| 6,792,460 B2 | 9/2004 | Oulu et al. | |
| 6,795,791 B2 | 9/2004 | Gorman | |
| 6,802,067 B1 | 10/2004 | Camp et al. | |
| 6,834,301 B1 | 12/2004 | Hanchett | |
| 6,836,878 B1 | 12/2004 | Cuomo et al. | |
| 6,851,118 B1 | 2/2005 | Ismael et al. | |
| 6,853,995 B2 | 2/2005 | Matsuzaki et al. | |
| 6,857,119 B1 | 2/2005 | Desai | |
| 6,862,711 B1 | 3/2005 | Bahrs et al. | |
| 6,871,228 B2 | 3/2005 | Shah et al. | |
| 6,880,125 B2 | 4/2005 | Fry | |
| 6,895,578 B1 | 5/2005 | Kolawa et al. | |
| 6,922,417 B2 | 7/2005 | Vanlint | |
| 6,925,631 B2 | 8/2005 | Golden | |
| 6,934,942 B1 | 8/2005 | Chilimbi | |
| 6,950,874 B2 * | 9/2005 | Chang et al. | 709/229 |
| 6,952,726 B1 | 10/2005 | White et al. | |
| 6,961,918 B2 | 11/2005 | Garner et al. | |
| 6,968,540 B2 | 11/2005 | Beck et al. | |
| 6,985,848 B2 | 1/2006 | Swoboda et al. | |
| 6,990,601 B1 | 1/2006 | Tsuneya et al. | |
| 6,993,453 B2 | 1/2006 | Krissell | |
| 7,000,235 B2 | 2/2006 | Mandal et al. | |
| 7,017,051 B2 | 3/2006 | Patrick | |
| 7,017,162 B2 | 3/2006 | Smith et al. | |
| 7,024,474 B2 | 4/2006 | Clubb et al. | |
| 7,051,324 B2 | 5/2006 | Gissel et al. | |
| 7,058,558 B2 | 6/2006 | Reichenthal | |
| 7,062,540 B2 | 6/2006 | Reddy et al. | |
| 7,069,267 B2 | 6/2006 | Spencer, Jr. | |
| 7,082,464 B2 | 7/2006 | Hasan et al. | |
| 7,085,851 B2 | 8/2006 | Nusbickel et al. | |
| 7,086,065 B1 | 8/2006 | Yeluripati et al. | |
| 7,086,067 B1 | 8/2006 | Wason | |
| 7,093,234 B2 | 8/2006 | Hibbeler et al. | |
| 7,120,685 B2 | 10/2006 | Ullmann et al. | |
| 7,131,113 B2 | 10/2006 | Chang et al. | |
| 7,150,014 B2 | 12/2006 | Graupner | |
| 7,152,104 B2 | 12/2006 | Musante et al. | |
| 7,155,501 B2 | 12/2006 | Mandal et al. | |
| 7,174,370 B1 | 2/2007 | Saini et al. | |
| 7,197,559 B2 | 3/2007 | Goldstein et al. | |
| 7,200,588 B1 | 4/2007 | Srivastava et al. | |
| 7,203,697 B2 | 4/2007 | Chang et al. | |
| 7,203,868 B1 * | 4/2007 | Evoy | 714/39 |
| 7,206,827 B2 | 4/2007 | Viswanath et al. | |
| 7,209,898 B2 | 4/2007 | Pfeiffer et al. | |
| 7,209,963 B2 | 4/2007 | Burton et al. | |
| 7,233,989 B2 | 6/2007 | Srivastava et al. | |
| 7,240,334 B1 | 7/2007 | Fluke et al. | |
| 7,251,809 B2 | 7/2007 | Barclay et al. | |
| 7,305,671 B2 | 12/2007 | Davidov et al. | |
| 7,412,497 B2 | 8/2008 | Viswanath et al. | |
| 7,493,624 B1 | 2/2009 | Kautzleben et al. | |
| 7,496,896 B2 | 2/2009 | Bley et al. | |
| 7,526,519 B2 | 4/2009 | Potter et al. | |
| 2002/0029298 A1 | 3/2002 | Wilson | |
| 2002/0073063 A1 | 6/2002 | Faraj | |
| 2002/0075325 A1 | 6/2002 | Allor et al. | |
| 2002/0170036 A1 | 11/2002 | Cobb et al. | |
| 2002/0186238 A1 * | 12/2002 | Sylor et al. | 345/736 |
| 2002/0188610 A1 | 12/2002 | Spencer | |
| 2003/0005173 A1 | 1/2003 | Shah et al. | |
| 2003/0041142 A1 | 2/2003 | Zhang et al. | |
| 2003/0051102 A1 | 3/2003 | Jacobs et al. | |
| 2003/0061247 A1 | 3/2003 | Renaud | |
| 2003/0069969 A1 | 4/2003 | Renaud | |
| 2003/0110252 A1 | 6/2003 | Yang-Huffman | |
| 2003/0120593 A1 | 6/2003 | Bansal et al. | |
| 2003/0167304 A1 | 9/2003 | Zhu et al. | |
| 2003/0177477 A1 | 9/2003 | Fuchs | |
| 2003/0225851 A1 | 12/2003 | Fanshier et al. | |
| 2003/0225872 A1 | 12/2003 | Bartek et al. | |
| 2003/0236880 A1 * | 12/2003 | Srivastava et al. | 709/224 |
| 2004/0003122 A1 | 1/2004 | Melillo | |
| 2004/0019662 A1 * | 1/2004 | Viswanath et al. | 709/220 |
| 2004/0019669 A1 | 1/2004 | Viswanath et al. | |
| 2004/0019684 A1 | 1/2004 | Potter et al. | |
| 2004/0022237 A1 | 2/2004 | Elliott et al. | |
| 2004/0028059 A1 | 2/2004 | Josyula et al. | |
| 2004/0031020 A1 | 2/2004 | Berry et al. | |
| 2004/0058652 A1 | 3/2004 | McGregor et al. | |
| 2004/0064552 A1 * | 4/2004 | Chong et al. | 709/224 |
| 2004/0073782 A1 | 4/2004 | Price et al. | |
| 2004/0078722 A1 | 4/2004 | Pfeiffer et al. | |
| 2004/0123279 A1 | 6/2004 | Boykin et al. | |
| 2004/0148610 A1 | 7/2004 | Tsun et al. | |
| 2004/0154011 A1 | 8/2004 | Wang et al. | |
| 2004/0158837 A1 | 8/2004 | Sengodan | |
| 2004/0215649 A1 | 10/2004 | Whalen et al. | |
| 2004/0230973 A1 | 11/2004 | Cundiff, Jr. et al. | |
| 2004/0244001 A1 | 12/2004 | Haller et al. | |
| 2004/0249613 A1 | 12/2004 | Sprogis et al. | |
| 2004/0268314 A1 | 12/2004 | Kollman et al. | |
| 2005/0010608 A1 | 1/2005 | Horikawa | |
| 2005/0022157 A1 * | 1/2005 | Brendle et al. | 717/104 |
| 2005/0028171 A1 | 2/2005 | Kougiouris et al. | |
| 2005/0033777 A1 | 2/2005 | Moraes et al. | |
| 2005/0038889 A1 | 2/2005 | Frietsch | |
| 2005/0039171 A1 | 2/2005 | Avakian et al. | |
| 2005/0039187 A1 | 2/2005 | Avakian et al. | |
| 2005/0097110 A1 | 5/2005 | Nishanov et al. | |
| 2005/0102536 A1 | 5/2005 | Patrick et al. | |
| 2005/0132041 A1 * | 6/2005 | Kundu | 709/224 |
| 2005/0132337 A1 | 6/2005 | Wedel et al. | |
| 2005/0172306 A1 | 8/2005 | Agarwal et al. | |
| 2005/0216584 A1 | 9/2005 | Chisholm | |
| 2005/0234931 A1 | 10/2005 | Yip et al. | |
| 2005/0234967 A1 | 10/2005 | Draluk et al. | |
| 2005/0257157 A1 | 11/2005 | Gilboa et al. | |
| 2006/0095674 A1 | 5/2006 | Twomey | |
| 2007/0226359 A1 | 9/2007 | Gunduc et al. | |

FOREIGN PATENT DOCUMENTS

| | | |
|---|---|---|
| JP | 2002073522 | 3/2002 |
| JP | 2002082777 | 3/2002 |
| WO | WO 0205102 A1 | 1/2002 |

WO          WO 0241154 A2    5/2002

OTHER PUBLICATIONS

"U.S. Appl. No. 10/813,788 Final Office Action Mailed Nov. 26, 2007 for", (Nov. 26, 2007), Whole Document.
"U.S. Appl. No. 11/026617 Final Office Action Mailed Nov. 20, 2007 for", (Nov. 20, 2007).
"OA mailed Jan. 18, 2008 for U.S. Appl. No. 10/814,907", (Jan. 18, 2008), Whole Document.
"OA Mailed Feb. 21, 2008 for U.S. Appl. No. 10/815018", (Feb. 21, 2008), Whole Document.
"FOA mailed Jun. 8, 2007 for U.S. Appl. No. 10/748,779", (Jun. 8, 2007), Whole Document.
"OA mailed Dec. 19, 2007 for U.S. Appl. No. 10/748,779", (Dec. 19, 2007), Whole Document.
"OA mailed Dec. 29, 2006 for U.S. Appl. No. 10/748,779", (Dec. 29, 2006), Whole Document.
"OA mailed Jun. 29, 2006 for U.S. Appl. No. 10/748,779", (Jun. 29, 2006), Whole Document.
"FOA mailed Oct. 16, 2007 for U.S. Appl. No. 10/748,951", (Oct. 16, 2007), Whole Document.
"OA mailed Jun. 12, 2007 for U.S. Appl. No. 10/748,951", (Jun. 12, 2007), Whole Document.
"OA Mailed Jan. 24, 2008 for U.S. Appl. No. 10/813,999", (Jan. 24, 2008), Whole Document.
"FOA mailed Jul. 2, 2007 for U.S. Appl. No. 10/813,788", (Jul. 2, 2007), Whole Document.
"OA mailed Jan. 25, 2007 for U.S. Appl. No. 10/813,788", (Jan. 25, 2007), Whole Document.
"Adding Systems to the Availability Monitoring Manually", http://help.sap.com/saphelp_erp2004/helpdata/en/38/9e0fe5d7980fffe10000009b3810a5/c..., Adding Systems to the Availability Monitoring Manually (SAP Library—The Alert Monitoring), (Downloaded Dec. 14, 2004), Whole Document.
"Alert Monitoring of the J2EE Engine Using CCMS", http://help.sap.com/saphelp_webas630/helpdata/en/92/ef30241c0f4a41959390a27e286ce..., Alert Monitoring of the J2EE Engine Using CCMS—SAP Library, (Downloaded Dec. 14, 2004), Whole Document.
"Availability and Performance Overview Monitor", http://help.sap.com/saphelp_erp2004/helpdata/en/ae/cd823bd26a5c42e10000000a114084..., Availability and Performance Overview Monitor (SAP Library—The Alert Monitor), (Downloaded Dec. 14, 2004), Whole Document.
"Availability Monitoring with CCMSPING", http://help.sap.com/saphelp_erp2004/helpdata/en/38/9e3337d7840ffee10000009b3810a5/..., Availability Monitoring with CCMSPING (SAP Library—The Alert Monitor), (Downloaded Dec. 14, 2004), Whole Document.
"CCMS Agents", http://help.sap.com/saphelp_nw04/helpdata/en/48/6a76607a7c91409474ad6c7b6f5a26/frameset.htm, Whole Document.
"CCMS Monitoring Architecture: Preconfigured Monitors for the Alert Monitor", *SAP Web Application Server 6.20* (Nov. 16, 2001), Whole Document.
"CCMS: Informix", http://help.sap.com/saphelp_erp2004/helpdata/en/73/61c850800e25478d24696196a969a5..., CCMS: Informix (SAP Library—CCMS: Informix), (Downloaded Dec. 14, 2004), Whole Document.
"Changing Monitoring Setting of Servers and Groups", http://help.sap.com/saphelp_erp2004/helpdata/en/6c/d667aa73bb9c428e9786eaf559f7ea/..., Changing Monitoring Setting of Servers and Groups (SAP Library—The Alert Monitor), (Downloaded Dec. 14, 2004), Whole Document.
"Configuring Availability Monitoring", http://help.sap.com/saphelp_erp2004/helpdata/en/38/9e100dd7980ffe10000009b3810a5/..., Configuring Availability Monitoring (SAP Library—The Alert Monitor), (Downloaded Dec. 14, 2004), Whole Document.
"Creating and Changing a Monitoring Pause", http://help.sap.com/saphelp_erp2004/helpdata/en/73/098488227c384f97c564225737108c..., Creating and Changing a Monitoring Pause (SAP Library—The Alert Monitor), (Downloaded Dec. 14, 2004), Whole Document.
"Creating and Changing Monitoring Rules", http://help.sap.com/saphelp_erp2004/helpdata/en/40/17fd8c1754324b81da9027f1bdbb75/..., Creating and Changing Monitoring Rules (SAP Library—The Alert Monitor), (Downloaded Dec. 14, 2004), Whole Document.
"Debugging J2EE Applications", *Sun Microsystems, Java—J2EE 1.4 Application Server Deveoper's Guide*, "Debugging J2EE Applications" Chapter 4, http://java.sun.com/j2ee/1.4 docs/devguide/dgdebug.html, 2003, printed Jul. 2, 2004 (11 pgs.), (2003), 11 pgs.
"How Introscope Works" *Wily Technology, Inc., Wily Solutions* "How Introscope Works"—*Enterprise Application Mangement*, http/www.wilytech.com/solutions/products/howWorks.html, 1999-2004, printed Jul. 2, 2004 (1 page)., 1999-2004, 1 page.
"Installing and Registering CCMS Agents", http://help.sap.com/saphelp_nw04/helpdata/en/48/6a76607a7c91409474ad6c7b6f5a26/frameset.htm, SAP Library, (Downloaded Dec. 14, 2004), Whole Document.
"Installing Availability Agent CCMSPING", http://help.sap.com/saphelp_erp2004/helpdata/en/79/498e3bae1d9e7ae10000000a114084..., Installing Availability Agent CCMSPING (SAP Library—The Alert Monitor), (Downloaded Dec. 14, 2004), Whole Document.
"Java Logging Overview", (Nov. 2001), pp. 1-9.
"Jikes Bytecode Toolkit: Overview", *Alphaworks*, www.alphaworks.ibm.com/tech/jikesbt, posted Mar. 31, 2000, 2 pages, printed Sep. 28, 2006.
"Mobile-Code Security Mechanisms for Jini", *Mobile-Code Security Mechanisms for Jini*—"Mobile-Code Security Mechanisms for Jini" *Download code, DISCEX 2001 Paper*, http://theory.stanford.edu/people/ijm/software/jinifilter.html, printed Jul. 2, 2004—(3 pgs.), (2001), 3 pgs.
"Monitoring", http://help.sap.com/saphelp_webas630/helpdata/en/68/f4bc3deaf28d33e10000000a11405..., Monitoring (SAP Library—J2EE Technology in SAP Web Application Server), (Downloaded Dec. 14, 2004), Whole Document.
"Operating System Monitor", http://help.sap.com/saphelp_nw04/helpdatafen/55/b5b93b5bb3493fe10000000a114084/frameset.htm, SAP Library, (Downloaded Dec. 14, 2004), Whole Document.
"Package Gnu.Bytecode", Package Gnu.Bytecode, http://sources.redhat.com/kawa/api.gnu/bytecode/package-summary.html, 4 pages, printed Sep. 28 2006.
"The Alert Monitor", http://help.sap.com/saphelp_nw2004s/helpdata/en/28/83493b6b82e908e10000000a11402f/content.htm, SAP Library, (Downloaded Dec. 14, 2004), Whole Document.
"The Java Object Instrumentation Environment", *Duke University*, www.cs.duke.edu/ari/joie/, last updated May 2003, printed Sep. 28, 2006, 2 pages.
"The Monitoring Architecture: Concept", http://help.sap.com/saphelp_nw04/helpdata/en/c4/3a7da1505211d189550000e829fbbd/frameset.htm, SAP Library, (Downloaded Feb. 27, 2008), Whole Document.
"The SAP J2EE Engine Monitoring Architecture", http://help.sap.com/saphelp_webas630/helpdata/en/83/6b20165833fa43b28f0349a4d3108..., The SAP J2EE Engine Monitoring Architecture (SAP Library—J2EE Technology in SAP . . . , (Downloaded Dec. 14, 2004), Whole Document.
"The Source for Developers: Core Java Java Management Extensions (JMX)", *Sun Microsystems, Inc.*, "The Source for Developers: Core Java Java Management Extensions (JMX)" 2 pages, http://java.sun.com/products/JavaManagement/printed 4-2-04., (Apr. 2, 2004), 2 pages.
"The Wily 5 Solution—Enterprise Aplications are Your Business", *Wily Technology, Inc., Wily Techonology, Inc., Wily Solutions* "The Wily 5 Solution—Enterprise Aplications are Your Business", http://www.wilytech.com/solutions/ibm_family.html, 1999-2004, printed Jul. 2, 2004 (2 pgs.), (1999-2004), 2 pgs.
"Wily Introscope", *Wily Technology, inc., Wily Solutions* "Wily Introscope" —*Enterprise Application Management*, http://www.wilytech.com/solutions/products/Introscope.html, 1999-2004, printed Jul. 2, 2004 (2 pgs.), (1999-2004), 2 pgs.

Affeldt, Reynald, et al., "Supporting Objects in Run-Time Bytecode Specialization", Reynald Affeldt, et al., "Supporting Objects in Run-Time Bytecode Specialization", *Department of Graphics and Computer Science, University of Tokyo, Asia-PEPM '02*, Sep. 12-17, 2002, *ACM*, pp. 50-60., Sep. 12-17, 2002), 50-60.

Burtscher, et al., "Automatic Generation of High-Performance Trace Compressors", *IEEE*, (2005), p. 1-12.

Burtscher, M, ""VPC3: A Fast and Effective Trace-Compression Algorithm"", *ACM*, (2004), p. 167-176.

Chander, Ajay, et al., "Mobile Code Security by Java Bytecode Instrumentation", Ajay Chander et al., "Mobile Code Security by Java Bytecode Instrumentation", *Proceedings of the DARPA Information Survivability Conference & Exposition DISCEX-II 2001*Jun. 12-14, 2001, *Stanford University of Pennsylvania, [*Partially suppo*, (Jun. 12-14, 2001), 14 pgs.

Chang, L., et al., "A Network Status Monitoring System Using Personal Computer", Chang, L.; Chan, W.-L.; Chang, J.; Ting, P.; Netrakanti, M., "A Network Status Monitoring System Using Personal Computer", *Global Telecommunications Conference, 1989, and Exhibition. 'Communications Technology for the 1990s and Beyond'. GLOBECOM '89. IEEE*, (1989), pp. 201-206.

Cohen, Geoff A., et al., "An Architecture for Safe Bytecode Insertion", Geoff A. Cohen, et al., *Software-Practice and Experience*, [Version: Mar. 6, 2000 v2.1] "An Architecture for Safe Bytecode Insertion", *Department of Computer Science, Duke University* (27 pqs.), (Mar. 6, 2000), 27 pgs.

Cohen, Geoff A., et al., "Automatic Program Tranformation with JOIE", *Paper, Departmen of Computer Science, Duke University*, 12 pages.

Dahm, Markus, "Welcome to the Byte Code Engineering Library 4.4.1", http://bcel.sourceforge.net/main.html, last updated Apr. 12, 2002, 2 pages, printed Sep. 28 2006.

Davies, Jonathan, et al., "An Aspect Oriented Performance Analysis Environment", Jonathan Davies, et al., *Proceedings of the 2nd international conference on* "An Aspect Oriented Performance Analysis Environment", 10 pgs., 2003, Boston, Massachusetts Mar. 17-21, 2003, 10 pgs.

Gagnon, Etienne, et al., "Effective Inline-Threaded Interpretation of Java Bytecode Using Preparation Sequences", Etienne Gagnon, et al., "Effective Inline-Threaded Interpretation of Java Bytecode Using Preparation Sequences", *Sable Research Group, Universite du Quebec a Montreal and McGill University*, Montreal, Canida, Jan. 23, 2003 (15 pqs.)., (Jan. 2003), 15 pgs.

Gill, Peter W., "Probing for a Continued Validation Prototype", Peter W. Gill, "Probing for a Continued Validation Prototype", *a Thesis Submitted to the Faculty of the Worcester Polytechnic Institute*, May 2001, (111 pages), (May 2001), 111 pages.

Goldberg, Allen, et al., "Instrumentation of Java Bytecode for Runtime Analysis", Allen Goldberg, et al., "Instrumentation of Java Bytecode for Runtime Analysis", *Fifth ECOOP Workshop on Formal Techniques for Java-like Programs*, Jul. 21, 2003, *Kestrel Technology, NASA Ames Research Center*, Moffett Field, California USA, (9 pgs.)., (Jul. 21, 2003), 9 pgs.

Hampton, Kip, "High-Performance XML Parsing with SAX", Published on XML.com by Feb. 14, 2001.

Hart, James, ""Early Adopter: J2SE 1.4"", *chapter 5, Wrox Press*, (Sep. 2001), pp. 1-12.

Kaplan, et al., ""Flexible Reference Trace Reduction for VM Simulations"", *ACM*, (2003), p. 1-38.

Keller, Ralph, et al., "Supporting the Integration and Evolution of Components Through Binary Component Adaptation", www.cs.ucsb.edu/oocsb, Sep. 9, 1997, *Technical Report TRCS97-15*, 12 pages.

Lee, Han B., "BIT: Bytecode Instrumenting Tool" *University of Colorado, Department of Computer Science 1997*, 51 pages.

Lee, Han B., et al., "BIT: A Tool for Instrumenting Java Bytecodes", .Han Bok Lee, et al., "BIT: A Tool for Instrumenting Java Bytecodes", *originally published in the Proceedings of the USENIX Symposium on Internet Technologies and Systems*, Monterey, California, Dec. 1997, www.usenix.org/ (11 pgs.)., (Dec. 1997), 11 pgs.

Li, Wen, et al., "Collaboration Transparency in the DISCIPLE Framework", Wen Li, et al., "Collaboration Transparency in the DISCIPLE Framework", *CAIP Center, Rutgers—The State University of New Jersey*, Piscataway, NJ, USA, *Proceeding of the ACM International Conference on Supporting Gruop Work (Group '99)* Nov. 14-17, 1999, 10 pgs.

Macrides, Nathan, "SANS Security Essentials (GSEC) Practical Assignment Version 1.4", Nathan Macrides, *Security Techniques for Mobile Code* "SANS Security Essentials (GSEC) Practical Assignment Version 1.4", Jul. 11, 2002, (11 pgs.).

McLaughlin, Brett, "Tip: Set up a SAX Parser", *Published by International Business Machines Corporation on Jul. 2, 2003*.

McNamee, Dylan, et al., "Specialization Tools and Techniques for Systematic Optimization of System Software", Dylan McNamee, et al., "Specialization Tools and Techniques for Systematic Optimization of System Software", *Oregon Graduate Institute of Science & Technology, and University of Rennes/IRISA, ACM Transactions on Computer Systems*, 2001 (30 pgs).

Nikolov, Nikolai, "Classfile Conversion Into An Organization of Objects, and Modification Thereof, To Effect Bytecode Modification", Nikolov, Nikolai, "Classfile Conversion Into An Organization of Objects, and Modification Thereof, To Effect Bytecode Modification", U.S. Appl. No. 10/750,396, Office Action mailed Sep. 5, 2006. the Offie Action, claims as they stood in the app.

Nikolov; Nikolai, "Execution of Modified Byte Code for Debugging, Testing And/Or Monitoring of Object Oriented Software", Nikolai Nikolov, "Execution of Modified Byte Code for Debugging, Testing And/Or Monitoring of Object Oriented Software", U.S. Appl. No. 10/749,617, filed Dec. 30, 2003, Ofice Action mailed Aug. 23, 2006. he Office Action, claims as they sto.

Office Action May 30, 2008, Office Action mailed May 30, 2008 for Pending U.S. Appl. No. 10/749,733.

Ploesh, Reinhold, "Evaluation of Assertion Support for the Java Programming Language", Reinhold Ploesh, Johannes Kepler University Linz, Austria, "Evaluation of Assertion Support for the Java Programming Language",*JOT: Journal of Object Technology*, vol. 1, No. 3, *Special Issue: Tools USA 2002 Proceedings*, pp. 5-17, http://www.jot.fm/issues/, (2002), 5-17.

Rudys, Algis, et al., "Enforcing Java Run-Time Properties Using Bytecode Bytecode Rewriting", Algis Rudys, et al., "Enforcing Java Run-Time Properties Using Bytecode Rewriting", *International Symposium on Software Security* (Tokyo, Japan), Nov. 2002, *Rice University*, Houston, TX 77005, USA (16 pqs.)., (Nov. 2002), 16 pgs.

Snyder, Alan, "The Essence of Objects: Concepts and Terms", *IEEE Software*, Jan. 1993, pp. 31-42, *Sunsoft, Mountain View*.

Stephenson, Ben, et al., "Characterization and Optimization of Java Applications", Ben Stephenson, et al., "Characterization and Optimization of Java Applications" *Department of Computer Science, Abstract in Western Research Forum Program & Abstracts*, p. 20, 2003., (2003), p. 20.

USPTO, Non-Final Office Action for U.S. Appl. No. 10/813,788 mailed Jul. 31, 2008.

Welch, Ian, et al., "Kava—Reflective Java Based on Bytecode Rewriting", Ian Welch, et. al., "Kava—A Reflective Java Based on Bytecode Rewriting" *SpringerLink—Verlag Berlinq Heidelberg 2000, Chapter, Lectures Notes in Computer Science*, W. Cazzola, et al. Editors, *Reflection and Software Engineering, LNCS*, pp. 155-167., (2000), 155-167.

Wu, et al., "From Trace Generation to Visualization: A Performance Framework for Distributed Parallel Systems", *IEEE*, (2000), pp. 1-18.

USPTO, Office Action mailed Jun. 20, 2008 for U.S. Appl. No. 10/749,850.

USPTO, Office Action mailed Jun. 4, 2008 for U.S. Appl. No. 10/750,007.

USPTO, Non-Final Office Action mailed Nov. 13, 2008 for U.S. Appl. No. 10/814,907.

USPTO, Non-Final Office Action for U.S. Appl. No. 10/750,007 Mailed Nov. 20, 2008, 21 pages.

USPTO, Final Office Action for U.S. Appl. No. 10/749,850, Mailed Jan. 22, 2009, 19 pages.

USPTO, Final Office Action for U.S. Appl. No. 10/748,779, Mailed May 14, 2008, 15 pages.

USPTO, Non-Final Office Action for U.S. Appl. No. 10/749,005, Mailed Feb. 3, 2009, 16 pages.

USPTO, Final Office Action, Final Office Action mailed Jun. 13, 2008 for Pending U.S. Appl. No. 10/814,907.

Perry, J. S., "Java Management Extensions", O'Reilly Media, Inc., (Jun. 18, 2002), pp. 1-30.

USPTO, "FOA Mailed Aug. 19, 2008 for U.S. Appl. No. 10/749,086", (Aug. 19, 2008), Whole Document.

USPTO, "FOA Mailed Sep. 26, 2007 for U.S. Appl. No. 10/749,086", (Sep. 26, 2007), Whole Document.

USPTO, "OA Mailed Feb. 29, 2008 for U.S. Appl. No. 10/749,086", (Feb. 29, 2008), Whole Document.

USPTO, "OA Mailed Feb. 4, 2009 for U.S. Appl. No. 10/749,086", (Feb. 4, 2009), Whole Document.

USPTO, "OA Mailed May 31, 2007 for U.S. Appl. No. 10/749,086", (May 31, 2007), Whole Document.

USPTO, "FOA Mailed Sep. 3, 2008 for U.S. Appl. No. 10/815,018", (Sep. 3, 2008), Whole Document.

USPTO, "FOA Mailed Aug. 28, 2008 for U.S. Appl. No. 10/813,999", (Aug. 28, 2008), Whole Document.

USPTO, "OA Mailed May 21, 2008 for U.S. Appl. No. 11/026,617", (May 21, 2008), Whole Document.

USPTO, "Office Action", U.S. Appl. No. 10/748,779, mailed Sep. 26, 2008, 16 pages.

Final Office Action for U.S. Appl. No. 10/813,788, Mailed Feb. 19, 2009, 18 pages.

Final Office Action for U.S. Appl. No. 10/748,779, Mailed Apr. 16, 2009, 13 pages.

Final Office Action for U.S. Appl. No. 10/749,740, Mailed Apr. 15, 2009, 22 pages.

Notice of Allowance for U.S. Appl. No. 10/748,951, Mailed Apr. 20, 2009, 26 pages.

Non-Final Office Action for U.S. Appl. No. 10/833,769 dated May 28, 2009; 10 pages.

Final Office Action for U.S. Appl. No. 10/814,907; dated Jun. 5, 2009; 31 pages.

Final Office Action mailed Jun. 11, 2008, for U.S. Appl. No. 10/749,005, filed Dec. 30, 2003. 13 pages.

Final Office Action mailed Aug. 10, 2007, for U.S. Appl. No. 10/749,005, filed Dec. 30, 2003. 8 pages.

Office Action mailed Jan. 4, 2008, for U.S. Appl. No. 10/749,005, filed Dec. 30, 2003. 10 pages.

Office Action mailed Feb. 26, 2007, for U.S. Appl. No. 10/749,005, filed Dec. 30, 2003. 10 pages.

Final Office Action for U.S. Appl. No. 10/750,007, Mailed Jul. 14, 2009, 14 pages.

Sun Microsystems, Java Management Extensions Instrumentation and Agent Specification, v1.0. May 3, 2000.

Final Office Action for U.S. Appl. No. 10/749,086, Mailed Jul. 29, 2009, 11 pages.

Final Office Action for U.S. Appl. No. 10/749;005, Mailed Aug. 3, 2009, 10 pages.

Non-Final Office Action for U.S. Appl. No. 10/749,850, Mailed Oct. 27, 2009, 12 Pages.

Non-Final Office Action for U.S. Appl. No. 10/814,907 Mailed Oct. 21, 2009, 32 Pages.

\* cited by examiner

METHOD AND SYSTEM FOR EMPLOYING A HIERARCHICAL MONITOR TREE FOR MONITORING SYSTEM RESOURCES IN A DATA PROCESSING ENVIRONMENT

BACKGROUND OF THE INVENTION

1. Field of the Invention

Embodiments of this invention generally relate to system resource monitoring and more particularly, to using a hierarchical monitor tree for monitoring of the resources.

2. Description of Related Art

In many modern computing systems and networks (systems), monitoring of system resources and components of significant importance to ensure not only the reliability and security of information flow, but also to promptly detect system deficiencies so that they are corrected in a timely manner. Typically, conventional client-server monitoring systems or architectures are used to perform monitoring of the resources.

FIG. 1 is a block diagram illustrating a conventional prior art monitoring system. As illustrated, typically, a conventional monitoring system (conventional system) 100 includes a monitor server 102 coupled with a client 104 and a data storage medium (storage) 110. The monitor server 102 is to monitor system resources (resources) 106-108 for the client 104. The monitor server 102 monitors the resources 106-108 in response to a request for monitoring received from the client 104. Typically, the storage 110 is used to store the monitoring data or information gathered by the monitoring server 102 from monitoring of the resources 106-108, and the monitoring data is then reported to the client 104. Stated differently, the data is not provided to the client 104 in real-time, delaying the detection and correction of deficiencies.

Conventional monitoring systems, however, do not provide real-time, continuous, or adequate monitoring of the resources, as they are limited in performance because of, for example, architectural limitations, inflexibility in levels of monitoring, lack of convenience in viewing the monitoring data, low level programming interface, and having the resources shared by all the software running on the system including virtual machines.

SUMMARY OF THE INVENTION

A method, apparatus, and system are provided for monitoring of system resources using a monitor tree. According to one embodiment, a resource may be associated with a monitor managed bean at a node of a monitor tree. Monitoring information regarding the associated resources may be requested from a runtime managed bean, and the monitoring information may be received by the monitor managed bean at the node of the monitor tree.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
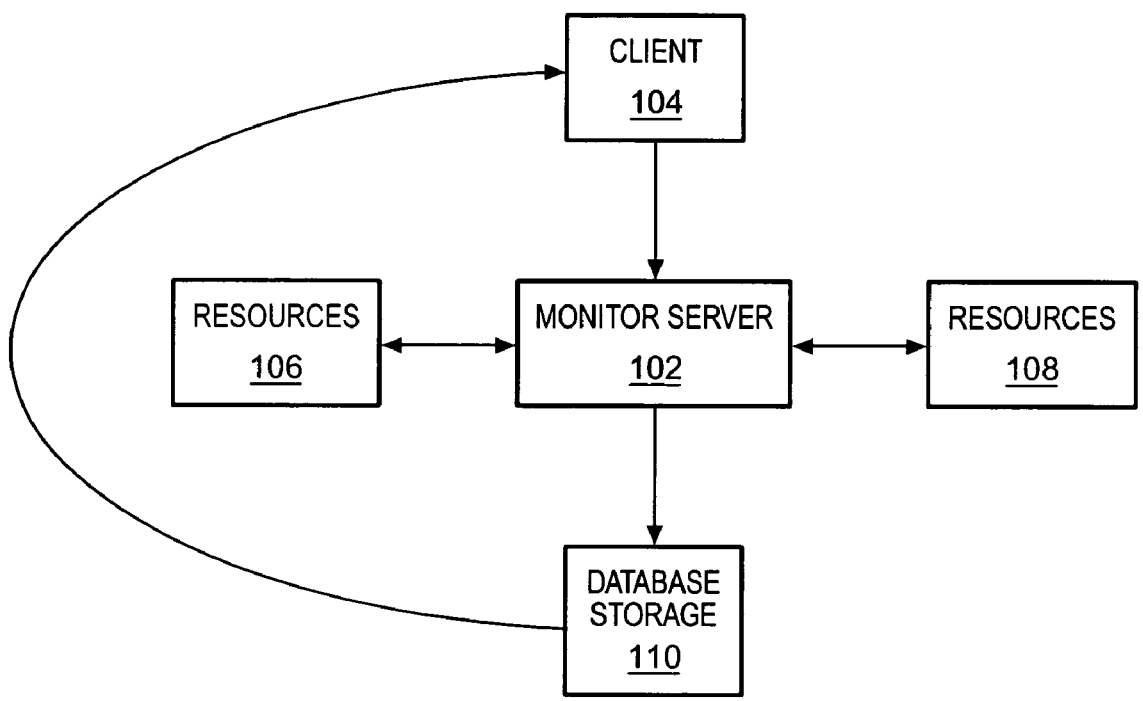
FIG. 1 is a block diagram illustrating a conventional prior art monitoring system.

A method, apparatus, and system are provided for monitoring of system resources using a monitor tree. Java objects, such as managed beans may be used for monitoring of the resources. The managed beans may include a combination of monitor managed beans (monitor beans) and runtime managed beans (runtime beans or resource beans). According to one embodiment, a monitor tree may be generated using instructions from a file from a central database. The monitor tree may include a number of nodes, each of the nodes having a monitor bean and a resource associated with the monitor bean. The monitor bean may request monitoring information from a runtime bean which may, in real-time, monitor one or more of the resources including the resource associated with the monitor tree. The runtime bean may provide, also in real-time, the monitoring information to the monitor bean at the node of the tree. The monitored resources may include Java resources associated with a Java 2 Platform, Enterprise Edition (J2EE) engine. Throughout this document, the use of the term "managed beans" in any combination may refer to Java Managed Beans (or Java MBeans). It should be noted, however, that the underlying principles of the invention are not limited to any particular application server specification or programming language.

According to one embodiment, runtime beans continuously provide monitoring information to monitor beans. According to another embodiment, the runtime beans provide the monitoring information to the monitor beans in response to a request from the monitor beans. According to yet another embodiment, the runtime beans provide a notification signal (runtime notification) to the monitor beans indicating the availability of the monitoring information. The monitor bean may, in response to the runtime notification, request the monitoring information, which the runtime bean will provide. According to yet another embodiment, a timer may be employed to provide a notification signal (timer notification) to the monitor beans to request the monitoring information from the runtime beans. The timer notification may be based on, for example, predetermined time period or availability of the monitoring information.

According to one embodiment, a monitor service may be employed to connect the monitor tree with a central database and client-level applications. The client-level applications may include, for example, a computing center management system ("CCMS"), a well known management and monitoring architecture designed by SAP AG for use in R/3 systems. Additional and/or alternate destinations may include administrative tools/viewers, standard Web browsers, and third party tools/viewers. As described in detail below, one embodiment of the administration tools includes a monitor viewer for displaying the monitoring information (e.g., based on the structure of the monitoring tree). Client-level applications may also be used to originate and send request to the monitor tree to request monitoring information regarding various monitored resources.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory ("CD-ROM"), magneto-optical disk, read-only memory ("ROM") random access memory ("RAM"), erasable programmable read-only memory ("EPROM"), electrically erasable programmable read-only memory ("EEPROM"), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
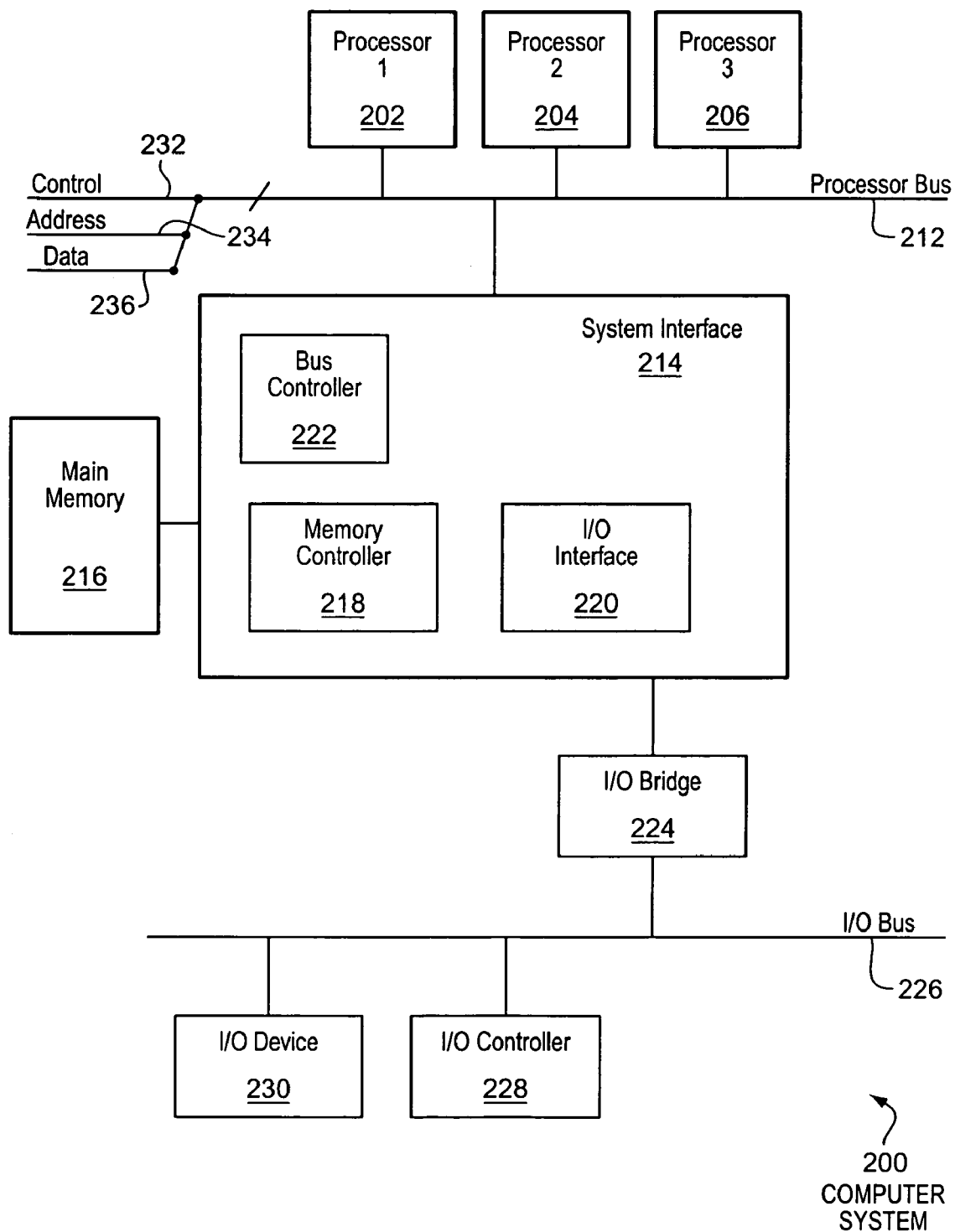
FIG. 2 is a block diagram illustrating an embodiment of a computer system.

FIG. 2 is a block diagram illustrating an embodiment of a computer system. The computer system (system) includes one or more processors 202-206 including one or more microprocessors, microcontrollers, field programmable gate arrays (FPGA), application specific integrated circuits (ASIC), central processing units (CPU), programmable logic devices (PLD), and similar devices that access instructions from system storage (e.g., main memory 216), decode them, and execute those instructions by performing arithmetic and logical operations.

The processor bus 212, also known as the host bus or the front side bus, may be used to couple the processors 202-206 with the system interface 214. The processor bus 212 may include a control bus 232, an address bus 234, and a data bus 236. The control bus 232, the address bus 234, and the data bus 236 may be multidrop bi-directional buses, e.g., connected to three or more bus agents, as opposed to a point-to-point bus, which may be connected only between two bus agents.

The system interface 214 may be connected to the processor bus 212 to interface other components of the system 200 with the processor bus 212. For example, system interface 214 may includes a memory controller 218 for interfacing a main memory 216 with the processor bus 212. The main memory 216 typically includes one or more memory cards and a control circuit (not shown). System interface 214 may also include an input/output (I/O) interface 220 to interface the I/O bridge 224 with the processor bus 212. The I/O bridge 224 may operate as a bus bridge to interface between the system interface 214 and an I/O bus 226. One or more I/O controllers 228 and I/O devices 230 may be connected with the I/O bus 226, as illustrated. I/O bus 226 may include a peripheral component interconnect (PCI) bus or other type of I/O bus.

The system 200 may include a dynamic storage device, referred to as main memory 216, or a random access memory (RAM) or other devices coupled to the processor bus 212 for storing information and instructions to be executed by the processors 202-206. The main memory 216 also may be used for storing temporary variables or other intermediate information during execution of instructions by the processors 202-206. System 200 may include a read only memory (ROM) and/or other static storage device coupled to the processor bus 212 for storing static information and instructions for the processors 202-206.

The main memory 216 may include a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. The main memory 216 may also include one or more hard disks, floppy disks, ZIP disks, compact disks (e.g., CD-ROM), digital versatile/video disks (DVD), magnetic random access memory (MRAM) devices, and other system-readable media that store instructions and/or data. The main memory 216 may store program modules such as routines, programs, objects, images, data structures, program data, and other program modules that perform particular tasks or implement particular abstract data types that facilitate system use.

The I/O device 230 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. The I/O device 230 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

The system 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of system 200 will vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays ("FPGAs"), TTL logic, or application specific integrated circuits ("ASICs"). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 3:
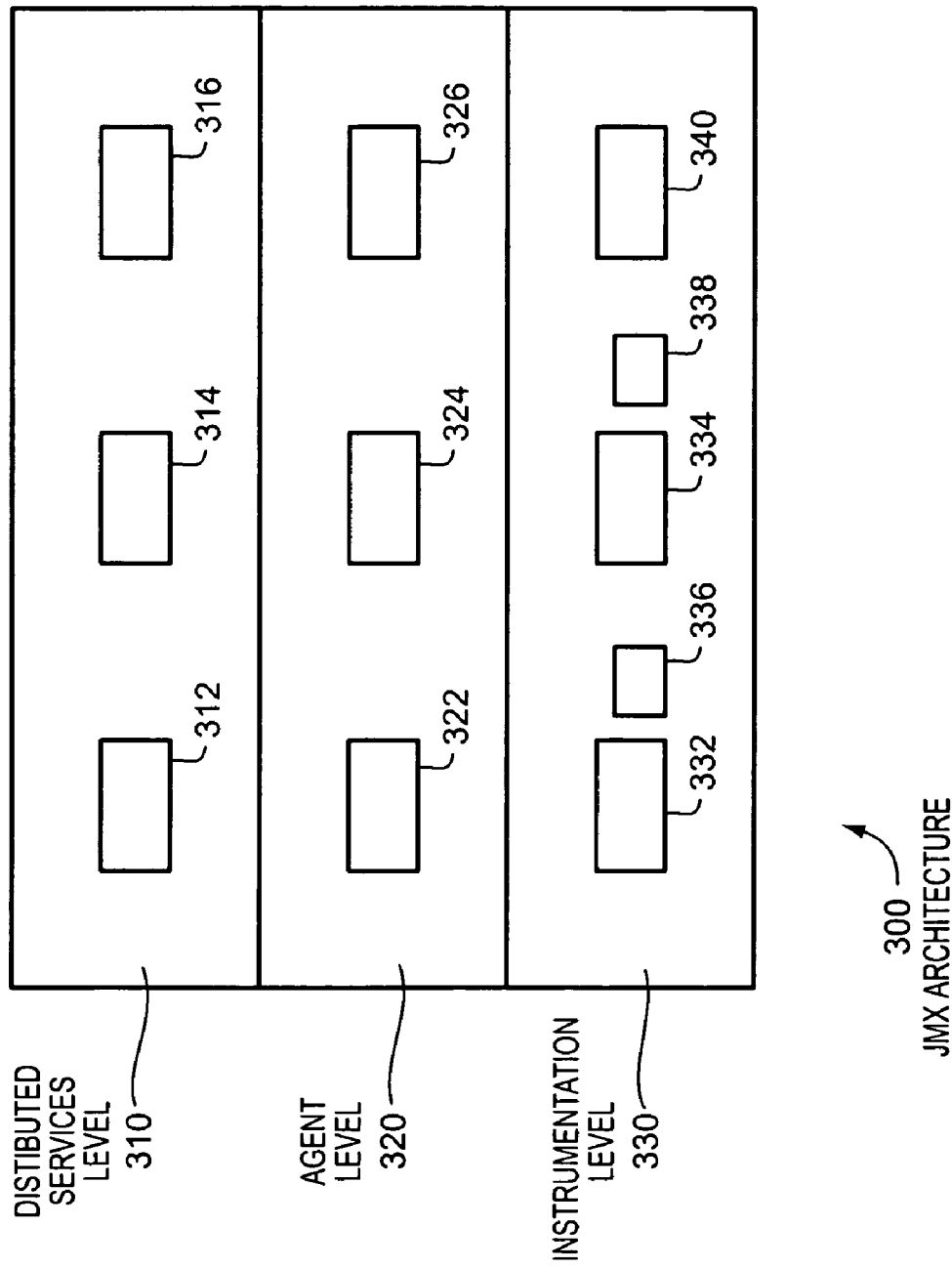
FIG. 3 is a block diagram illustrating an embodiment of Java Management Extensions architecture.

FIG. 3 is a block diagram illustrating an embodiment of Java Management Extensions architecture. The illustrated embodiment of Java Management Extensions ("JMX") architecture 300 includes three layers or levels 310, 320, 330. According to one embodiment, the three levels 310, 320, 330 may include a distributed services level (or manager or user or client level) 310, an agent level (or application level) 320, and an instrumentation level (or database level) 330. Some or all of the elements at each of levels of the JMX architecture 300 may be, directly or indirectly, interconnected via a network (e.g., a Local Area Network ("LAN")). Alternative embodiments of the JMX architecture 300 may include more or fewer levels.

The distributed services level 310 may serve as an interface between the JMX architecture 300 and one or more users or clients. As illustrated, the distributed services level 310 may include one or more user terminals 312-314. One or more of the user terminals 312-314 to collect and gather user input and send it to the agent level 320 over a network connection. Network connection may be a wired or wireless connection to a Local Area Network (LAN), a Wide Area Network (WAN), a Metropolitan Area Network (MAN), an intranet, and/or the Internet. Distributed services level terminals 312-314 may include personal computers, notebook computers, personal digital assistants, telephones, and the like. According to one embodiment in which network connection may connect to the Internet, one or more of the user terminals 312-314 may include a Web browser (e.g., Internet Explorer or Netscape Navigator) to interface with the Internet.

According to one embodiment, the distributed services level 310 may also include management applications 316, such as a JMX-compliant management application, a JMX manager, and/or a proprietary management application. The management applications 316 may also include one or more graphical management applications, such as a visual administrator, operating to, for example, retrieve and display information received from the agent level 320 and/or the instrumentation level 330.

The visual administrator may include a monitor viewer to display such information. Management applications 316 may also include third party tools including a file system to store the information and may also include a Graphical User Interface ("GUI")-based monitor viewer to display the information. The distributed services level 310 may also include the CCMS system described above.

The agent level 320 may include one or more application servers 322-326. An application server may refer to a computing device that performs data processing. The agent level 320 may also include a computing device (e.g., a dispatcher) to perform load balancing among application servers 322-326. According to one embodiment in which the agent level 320 exchanges information with the distributed services level 310 via the Internet, one or more of the application servers 322-326 may include a Web application server. According to one embodiment, the application servers 322-326 may be implemented according to the Java 2 Enterprise Edition Specification v1.4, published on Jul. 12, 2002 ("the J2EE Standard"). In one embodiment of the invention, the management techniques described herein are used to manage resources within a "cluster" of server nodes. An exemplary cluster architecture is described below with respect to FIGS. 14-15. However, the underlying principles of the invention are not limited to any particular application server architecture.

The applications servers 322-326 may include one or more dedicated Java Managed Bean ("MBean") servers having agent services. According to one embodiment, for and at each Java virtual machine ("JVM") with managed resources, there may be one or more agents operating at the agent level 320. The one or more agents may include the one or more MBean servers, agent services, a set of MBeans, one or more connectors, and/or one or more protocol adaptors. An MBean Server may include a registry for MBeans and act as a single entry point for calling MBeans in a uniform fashion from management applications at other JVMs.

The instrumentation level 330 may provide a data storage medium for the JMX architecture 300. As illustrated, according to one embodiment, the instrumentation level 330 may include one or more database management systems ("DBMS") 332-334 and data sources 336-338. According to one embodiment, the data sources 336-338 may include databases and/or other systems capable of providing a data store.

Furthermore, according to one embodiment, the instrumentation level 330 may include one or more hosts including one or more resources having MBeans, such as instrumentation MBeans. The instrumentation level 330 may make Java objects available to management applications 316. The Java objects instrumented according to the JMX-standard may include MBeans. According to one embodiment, the resources represented by MBeans may include managed resources 340. The managed resources 340 may include a kernel, a server component, or the like. MBeans may expose a management interface including constructors, attributes, operations, and notifications.

Figure 4:
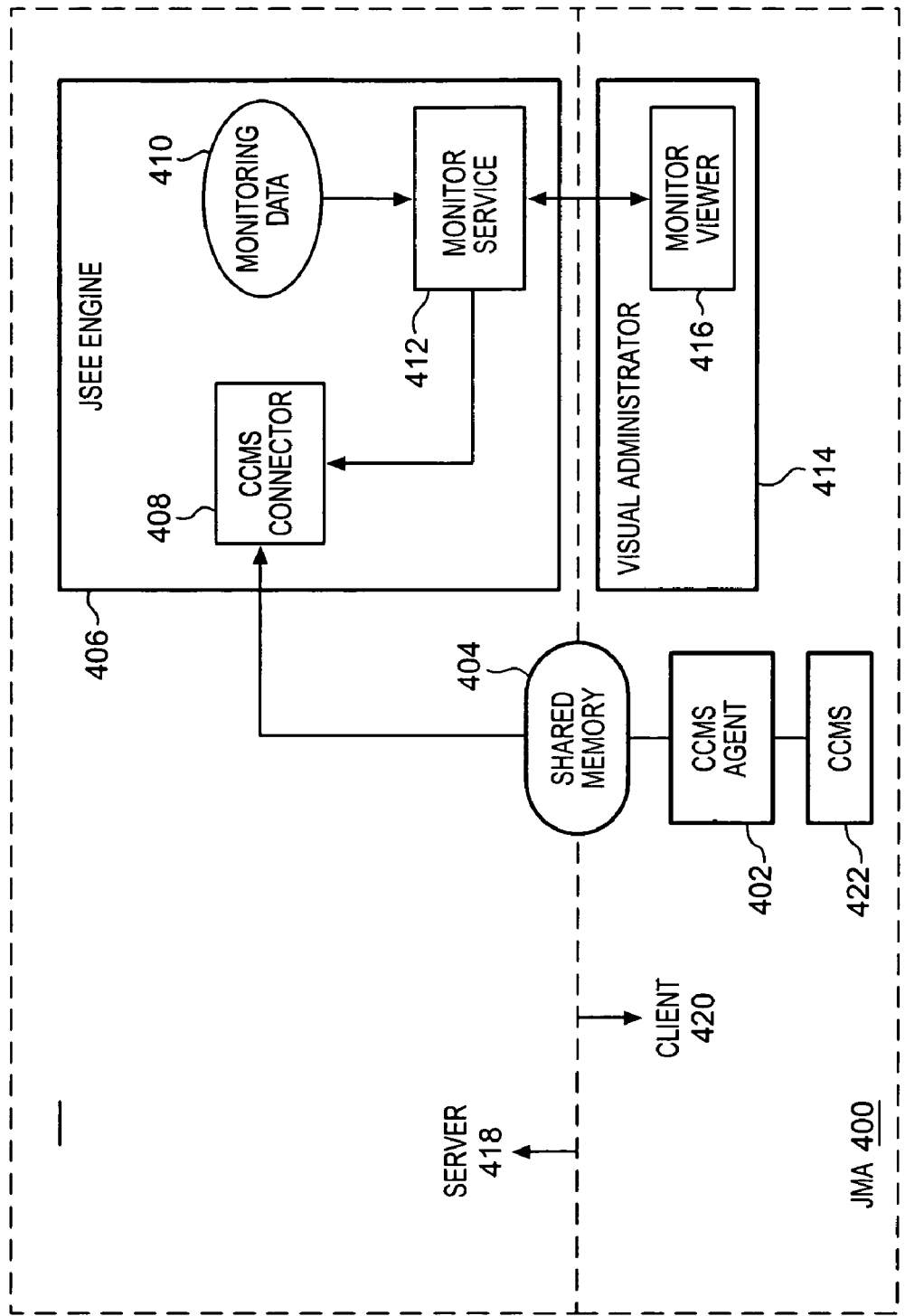
FIG. 4 is a block diagram illustrating an embodiment of Java monitoring architecture.

FIG. 4 illustrates one embodiment of the invention implemented within a JMX-based Java monitoring architecture (JMA) 400 for administration and management of the Java 2 Platform, Enterprise Edition ("J2EE") engine 406. According to one embodiment, the administration and management of the resources associated with the J2EE engine 406 may include monitoring of various system resources, including Java resources and other arbitrary resources and resources associated with the J2EE engine 406, including kernel, services, interfaces, libraries for each of the dispatchers and servers, network connections, memory consumption, threads, classloaders, database connections, database transactions, HyperText Transport Protocol ("HTTP") cache, Java Messaging Service ("JMS") queries and topics, sessions, and the like, using a monitoring service, such as the monitoring service 412.

According to one embodiment, various services of the monitoring service 412 may include monitoring of the resources, gathering of the monitoring data relating to the monitored resources, and maintaining of the monitoring data 410. The maintaining of the monitoring data 410 may include maintaining history and providing alerts when various resources, such as parameters, applications, or components reach a critical state, and such features may be enabled or disabled depending on when and whether the J2EE engine 406 is connected to the CCMS 422 via CCMS agent 402 with shared memory 404, directly or indirectly, coupled with the CCMS agent 402 and CCMS connector 408.

According to one embodiment, the JMA 400 may include the monitoring service 412 and one or more JMX-based monitor servers (JMX monitors). The monitoring service 412 may help establish a connection between a JMX monitor and the various components of the JMA 400. According to one embodiment, JMX monitors may reside and work on separate or remote Java virtual machines (JVMs) to collect data from cluster elements, and report information and statistics regarding the cluster nodes and their components to, for example, the visual administrator 414 having a monitor viewer 416, and/or to the CCMS 422 via the CCMS agent 402, and to various other third party tools. The CCMS 422, the visual administrator 414, and other third party tools may reside generally on the client side 420, while other components, as illustrated, may reside on the server side 418.

Figure 5:
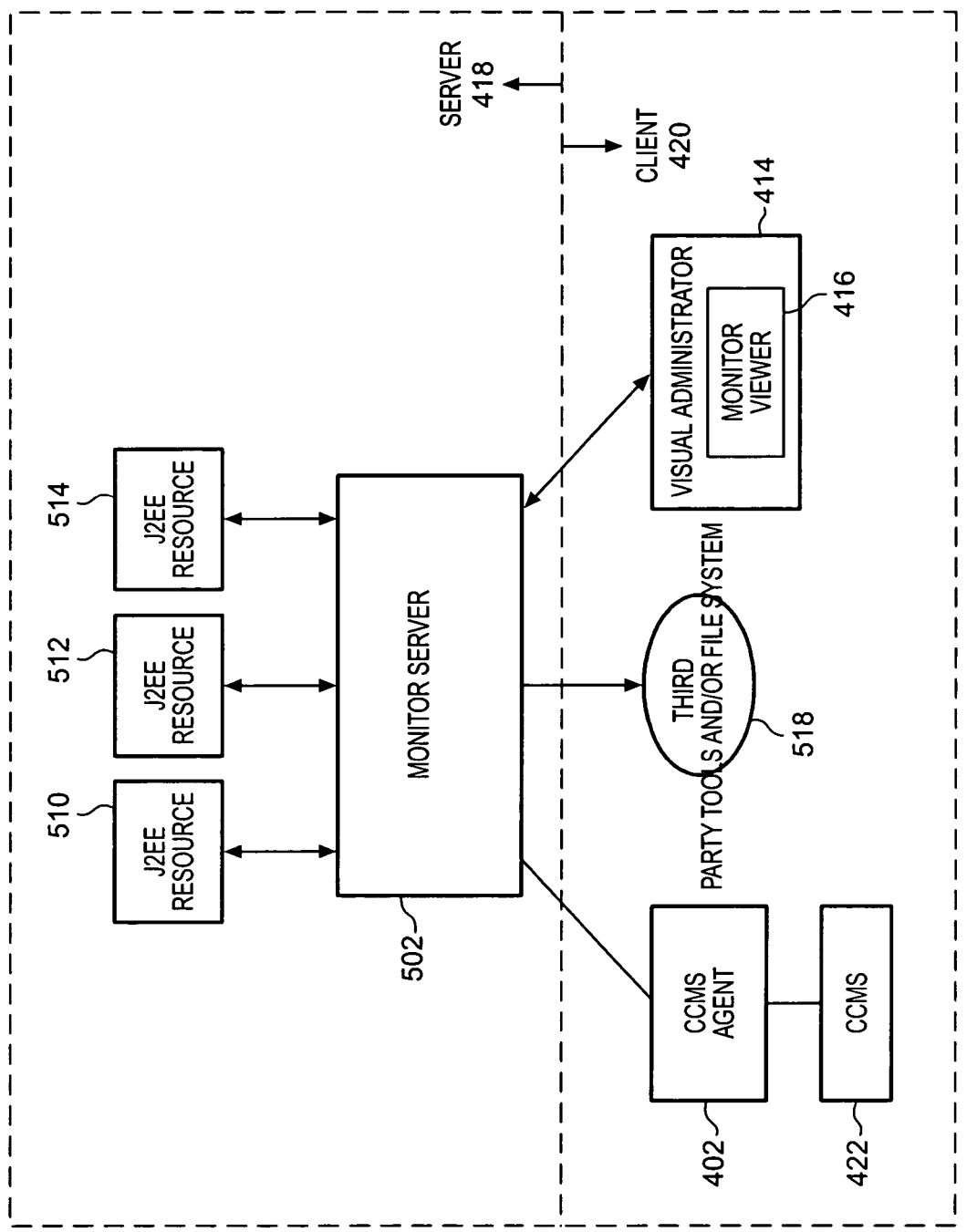
FIG. 5 is a block diagram illustrating an embodiment of Java monitoring architecture.

FIG. 5 illustrates an embodiment of the invention employed within a Java monitoring architecture ("JMA") 500. The illustrated embodiment includes a monitor server 502 comprised of a JMX-based monitors (JMX monitor) to, for example, monitor and collect data from various cluster elements and resources 510-514 of an application server engine. In one embodiment the application server engine is a Java 2 Platform, Enterprise Edition (J2EE) engine (e.g., J2EE engine 406 of FIG. 4). However, as stated above, the underlying principles of the invention are not tied to any particular specification or set of specifications. According to one embodiment, the monitor server 502 reports or transmit the collected data to various client-side 420 components and/or applications, such the visual administrator 414 having a monitor viewer 416. The monitor viewer 416 may be used to enable viewing of the monitoring data received from the monitor server 502.

The data collected may include information and statistics related to, for example, applications, server parameters, cluster nodes and their components of the J2EE engine. According to one embodiment, the collected data may also be reported to the CCMS 422 via a CCMS agent 402, and/or to the third party tools 518. In one embodiment, the third party tools 518 include a file system to, for example, temporarily store the collected data in a specified file format such as, for example, an Extensible Markup Language ("XML") format or a HyperText Markup Language ("HTML") format. The collected data may subsequently be reported to the components on the client-side 420 (e.g., in an XML or HTML format.

According to one embodiment, the expected overhead of the JMA 500 may vary according to its functionality. For example, the overhead may be light when reporting to the CCMS 422 or the third party tools 518, as opposed to when reporting to the visual administrator 414. Furthermore, the larger the requesting and/or reporting interval of the monitor server 502, the smaller the expected overhead may be. The expected overhead may be relatively higher when using the monitor viewer 416 of the visual administrator 414 to actively retrieve and view the monitoring data.

Figure 6:
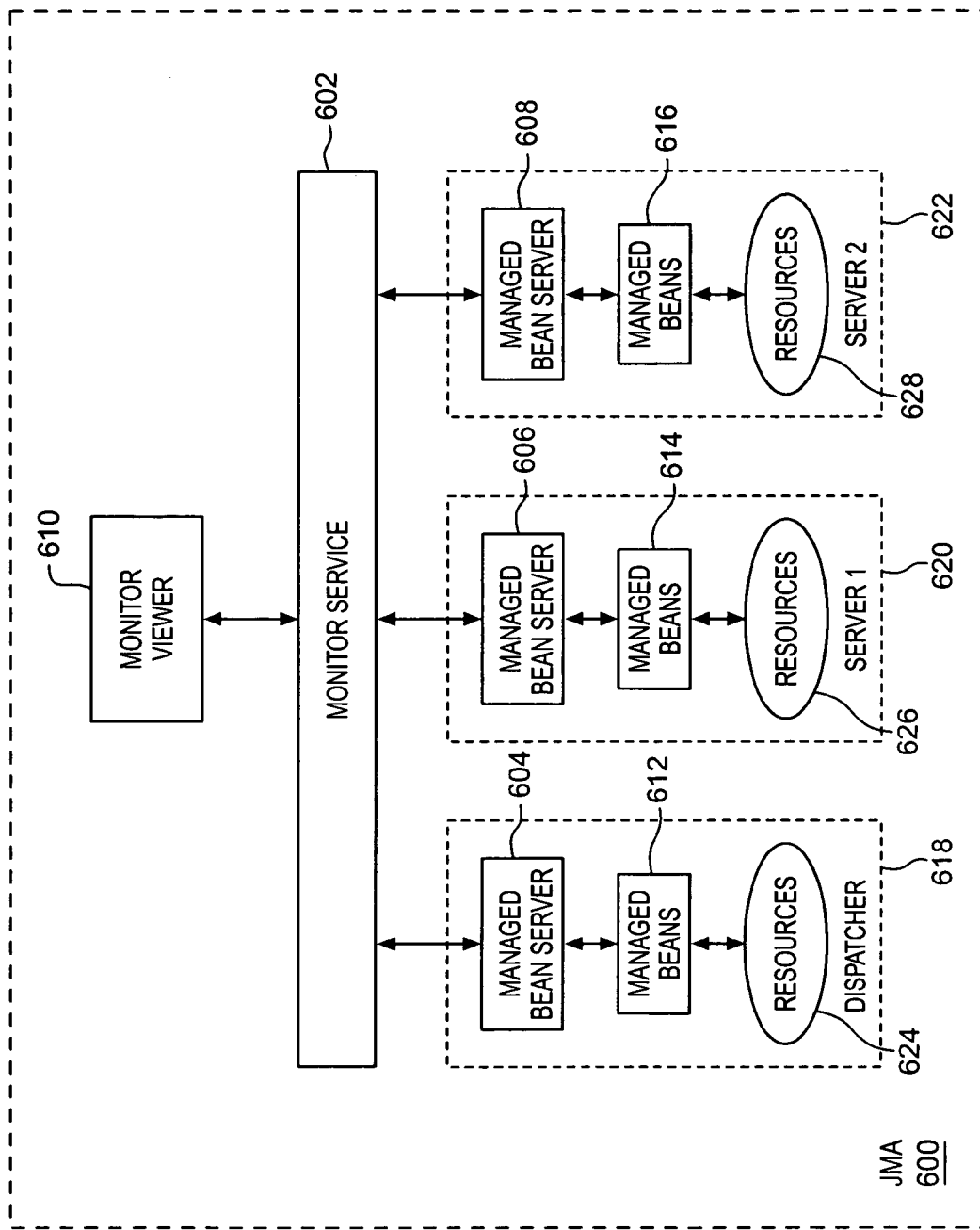
FIG. 6 is a block diagram illustrating an embodiment of Java monitoring architecture.

FIG. 6 is a block diagram illustrating an embodiment of a Java monitoring architecture. According to one embodiment, as illustrated, the Java monitoring architecture (JMA) 600 may include a monitor service 602 to establish connection between one or more managed bean servers (bean servers) 604-608 with the rest of the JMA 600, including administrative tools having a visual administrator monitor viewer 610. The monitor viewer 610 may include a Graphical User Interface (GUI)-based monitor viewer or a monitor browser. The monitor service 602 may include a number of components including monitor servers and interfaces.

According to one embodiment, managed beans (MBeans or beans) (e.g., runtime managed beans or resources beans) 612-616 may be used to provide continuous monitoring of various resources 624-628 associated with a Java 2 Platform, Enterprise Edition (J2EE) engine, such as the J2EE 406 of FIG. 4. The resources 624-628 include a kernel, services, interfaces, and libraries for dispatchers and servers, such as the dispatcher 618 and servers 620-622.

Figure 7:
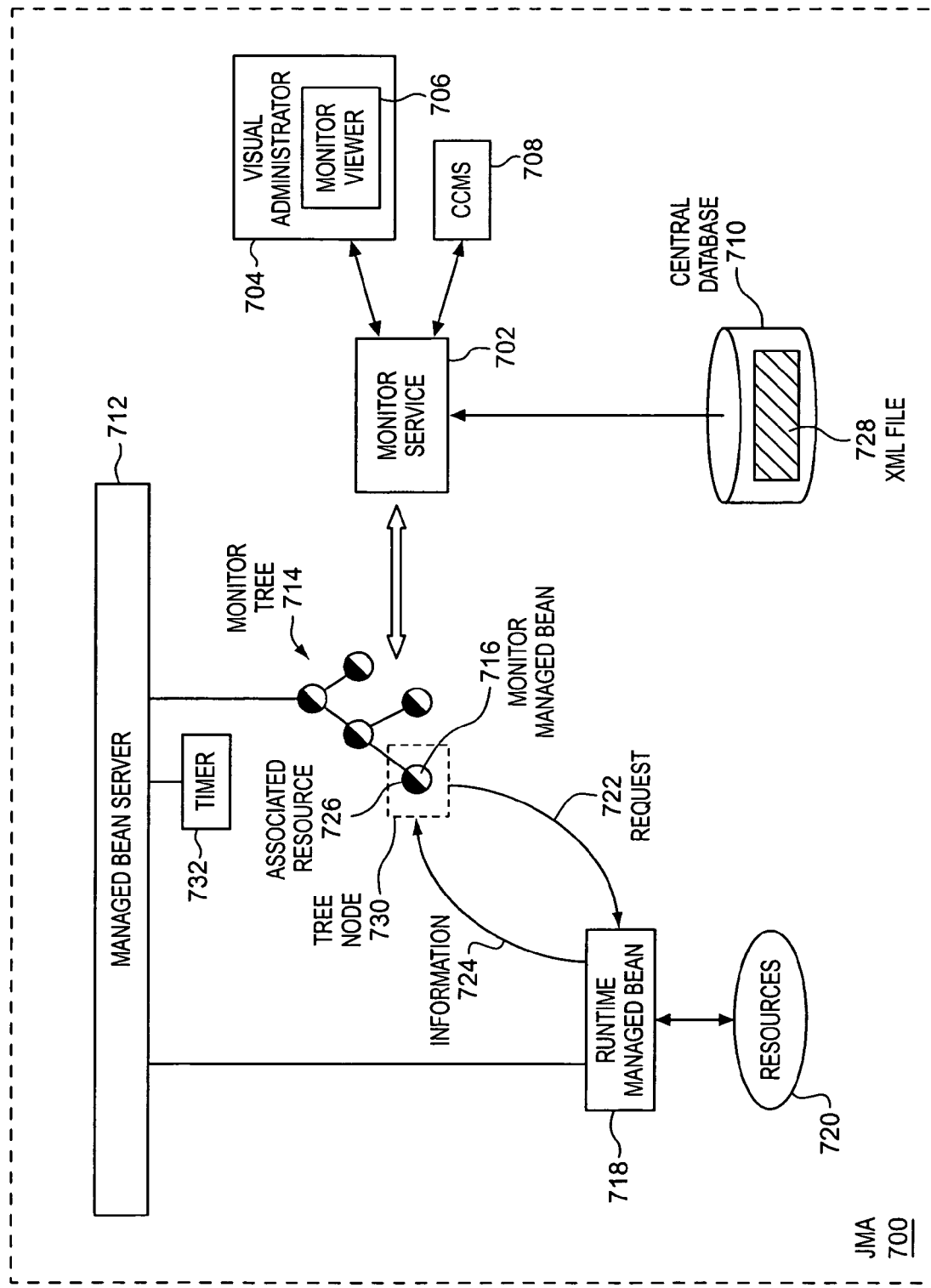
FIG. 7 is a block diagram illustrating an embodiment of a Java monitoring architecture including a monitor tree.

FIG. 7 is a block diagram illustrating an embodiment of a Java monitoring architecture including a monitor tree 714. Monitoring typically refers to a periodic oversight of a process, or the implementation of an activity, which seeks to establish the extent to which input deliveries, work schedules, required actions and targeted outputs are proceeding according to plan, so that timely action can be taken to correct the deficiencies detected. According to one embodiment, Java monitoring system or architecture (JMA) 700 and its various components, including modules and servers, may be used to provide monitoring of resources and the semantics of data to ensure oversight, and may provide monitoring information to enable the proper analysis of the resources 720. Furthermore, according to one embodiment, JMA 600 may ensure first level of data processing, analysis, evaluating, and transporting of the data to various modules (e.g., monitor tree) and customer level components (e.g., CCMS 708, administrative tools, including a visual administrator 704, and third-party tools or plug-ins).

According to one embodiment, JMA 600 provides monitoring of the Java 2 Platform, Enterprise Edition (J2EE) engine 406 (see, e.g., FIG. 4), and its associated resources 720, including but not limited to various managers, services, components, such as a kernel, interfaces, libraries for each of the dispatchers and servers, network connections, memory consumption, threads, classloaders, database connections, database transactions, HyperText Transport Protocol ("HTTP") cache, Java Messaging Service ("JMS") queues and topics, and sessions.

For monitoring of the resources 720, the JMA 700 may employ a monitor service 702 having modules, servers, and/or interfaces to connect the monitoring side with the rest of the JMA 700, including the central database 710 and client-side applications, such as the visual administrator 704 and CCMS 708. The monitoring architecture may include a managed bean server (bean server) 712, a plurality of monitor managed beans (monitor beans) 716 and/or runtime managed beans (runtime beans) 718. In one embodiment, the runtime beans 718 register with the bean server 712 to provide monitoring of the underlying resources 720 at runtime. The bean server 712 may include a container for the monitor beans 716 and the runtime beans 718, to provide them access to various resources 720 and management applications 704, 708.

To provide Java objects (e.g., monitor beans 716 and runtime beans 718) to various applications 704, 708 and to use the bean server 712 for such purposes, the applications 704, 708 may be made available via the distributed services level (e.g., distributed services level 310 of FIG. 3) of the JMX-based architecture (e.g., JMA 700). For example, well-known protocols such as HTTP may be used to communicate with the bean server 712 via an appropriate protocol adapter that may translate operations into representations in a given protocol. In addition, one or more connectors may be used to communicatively couple the applications 704, 708 to the bean server 712 using a proprietary protocol.

The JMA 600 may be spread into three levels of the JMX architecture including a distributed services level 310, an agent level 320, and an instrumentation level 330 (see, e.g., FIG. 3). The instrumentation level may include, for example, the monitor and runtime beans 716, 718, the agent level may include, for example, the bean server 712, and the distributed services level may include, for example, various applications 740, 708, adaptors, and connectors.

According to one embodiment, various Java resources 720 at the agent level may be included as an external library. A JMX service module (jmx_service) may provide some of the functionality from the distributed services level, and may create an instance of the bean server 712 on each of the nodes in one or more clusters and provide local and cluster connections to all of them. The monitor beans 716 may be registered clusterwide. As such, a user or client may work with the bean server 712 transparently (e.g., from the user's perspective there may appear to be only one bean sever 712 showing all monitor beans 716 of the cluster). In addition, to receive JMX notifications clusterwide, a notification service module (jmx_notification) may be employed in combination with the JMX service.

The bean server 712 may include a registry of the monitor and runtime beans 716-718, and the bean server 712 may serve as a single entry point for calling the monitor and runtime beans 716-718 in a uniform fashion from applications 704, 708 to monitor the resources 720, and collect or gather the monitoring data or information associated with the monitored resources 726. According to one embodiment, the bean server 712 may reside at a particular Java virtual machine (JVM) and may call the registered monitor and runtime beans 716-718 from the same JVM or other JVMs. According to one embodiment, the bean server 712 may not be limited to one bean server 712 and may include multiple managed bean servers. According to one embodiment, various modules of the monitor service 702 may also reside at the same JVM along with the bean server 712, or may reside at other one or more JVMs that may be remotely located.

According to one embodiment, the resources 720 including kernel resources, libraries, interfaces, and services may be monitored using the runtime and monitor beans 716-718 registered with the bean server 712. To monitor the resources 720, including arbitrary Java resources, and be manageable, a management interface may be provided, and objects (e.g., monitor bean 716 and runtime bean 718) that implement such management interface may be registered with the bean server 712. The bean server 712, as previously described, may then serve as a container for the monitor bean 716 and the runtime bean 718, and provide them with access to the resources 720 to be monitored.

According to one embodiment, the runtime bean 718 (also sometimes referred to herein as a "resource" bean) may provide continuous or periodic monitoring of the resources 720 and may provide dynamic resource notifications or responses including information regarding the resources 720 to each of the monitor beans 716. According to one embodiment, the monitor service 702 may retrieve an Extensible Markup Language (XML) file 728, having semantics and installation directives on how a monitor tree 714 is created, from the database 710 to create the monitor tree 714. The monitor tree 714 may then be generated with various nodes, such as the node 730. Each of the nodes includes one or more monitor beans 716 associated with one or more resources 726.

According to one embodiment, the monitor bean 716 at the node 730 may request 722 information regarding its associated resource 726 from the runtime bean 718 associated with the resource. For example, the monitor bean 716 may invoke a method or request 722 during runtime to retrieve monitoring data from the runtime bean 718, and the runtime bean 718 may respond or provide a notification including the requested information 724 to the monitor bean 716 regarding the associated resource 726. According to another embodiment, the information 724 regarding the associated resource 726 may be provided periodically as predetermined and pre-set using a timer 732. The timer 732 may include predetermined criteria including a predetermined time period for periodically providing information 724 from the runtime bean 718 to the monitor bean 716.

The monitor service 702 may include an administrative services interface to provide the monitoring data or information to, for example, administrative tools including the visual administrator 704. The information received at the visual administrator 704 may be displayed using a monitor viewer 706 including a Web-based monitor browser or Graphical User Interface (GUI)-based monitor viewer. The monitor service 702 may include other interfaces, such as a managed enterprise Java beans ("MEJB") interface, to connect to remote third party tools, and a CCMS agent to connect to the CCMS 708.

The MEJB of the MEJB interface may include the following three types of beans: (1) session beans to perform processing; (2) entity beans to represent data, which may be a row, a column, or a table in a database, and (3) message driven beans that are generated to process Java messaging service (JMS) messages. The MEJB may reside in and may be executed in a runtime environment (e.g., MEJB container), which may provide a number of common interfaces and service to the MEJB. The common interfaces and services may include security and transaction support. The MEJB interface may provide future scalability and allow multiple user interfaces to be used, such as a standard Web browser.

The managed beans, such as the monitor and runtime beans 716-718, may include the following two logical types of registered managed beans: (1) standard beans and (2) specific beans. Standard beans may provide standard functionality of start/stop, get/set properties, etc. Standard beans may be registered by default for all deployed components (e.g., kernel, libraries, interfaces, and services). Specific beans may provide component-specific functionalities that may vary from one component to another. To have the specific beans, a component may register an object that may implement a specific interface to list the processes available for its management and to extend the management interface (e.g., com- .company.engine.frame.state. ManagementInterface).

According to one embodiment, for kernel resources, a standard bean may be registered with each manager having a specific bean. A prerequisite for this may be to return a non-null value in a method (e.g., getManagementInterface( )) from the manager interface. For libraries and interfaces, only standard beans may be registered. For services, except for the already registered standard beans, each of the services may register specific beans. Implementation of the management interface may also cause a specific bean to be registered for that particular service.

Figure 8:
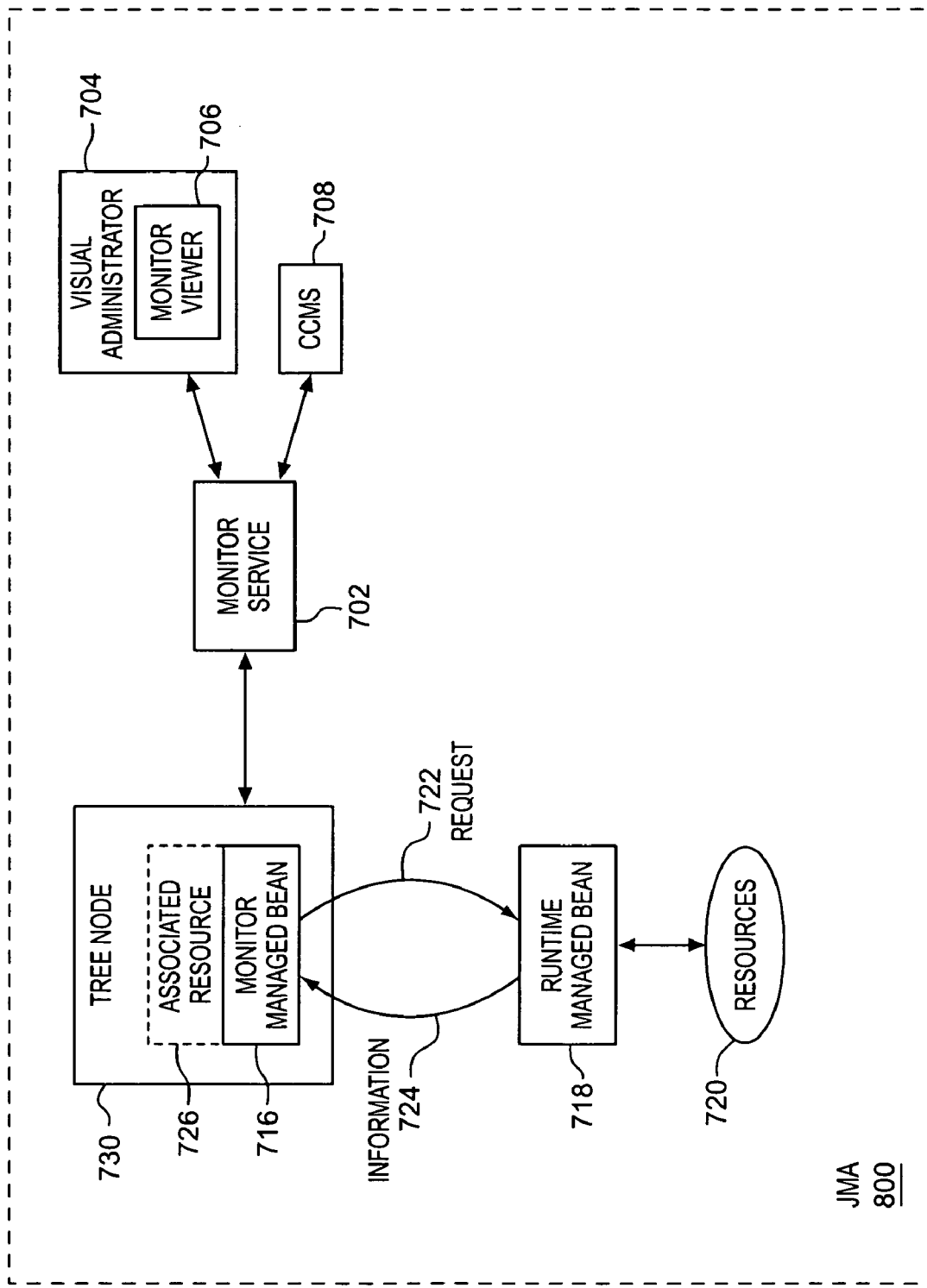
FIG. 8 is a block diagram illustrating an embodiment of a tree node of a monitor tree.

FIG. 8 illustrates an embodiment of a tree node 730 of a monitor tree. According to one embodiment, a hierarchical monitor tree 714 may be created to provide a grouping of monitoring agents (e.g., monitor bean 716) and the resources 726 associated with the monitoring agents, to provide a more manageable monitoring architecture. Although the monitoring agents and their corresponding resources may be grouped in a monitor tree, they are individually represented as tree nodes, and provide individual reporting of each of the resources, releasing the module developer from programmatically reporting the monitoring data to a central location.

For example, according to one embodiment, using the monitor tree, the module developer may configure runtime beans 718 to monitor one or more resources 720 and provide the monitoring information 724 to monitor beans 716 at a particular node 730 (or group of nodes). The monitoring information 724 provided to the monitor bean 716 may be provided continuously and/or upon request 722 from the monitor bean 716 associated with the underlying resource 726.

The associated resource 726 is associated with a particular monitor bean 716 to individualize the monitoring process (i.e., by receiving monitoring information about a particular resource, as opposed to about all of the resources 720). Similarly, according to one embodiment, particular resources 720 may be associated with one or more runtime beans 718 to further individualize the process. The resources 720 may include the kernel, services, interfaces, libraries, and the like, for each of the dispatchers and servers associated with an application server engine (e.g., such as the Java 2 Platform, Enterprise Edition (J2EE) engine 406 described above).

As used herein, a "J2EE server" may include distributed J2EE servers, including, for example, multiple instances of a group of redundant J2EE servers and a dispatcher. The associated resource 726 may refer to one of the resources 720 that is associated with the monitor bean 716 at the node 730 to, for example, allow the monitor bean 716 to request monitoring information from the runtime bean 718. The end result is a simplified distribution of monitoring information in the form of a monitor tree with individual nodes, as opposed to a system in which monitoring information must be centralized.

According to one embodiment, the monitoring data 724 may then be provided to various client level applications, such as the visual administrator 704 and/or CCMS 708 via the monitor service 702. According to one embodiment, the monitor viewer 706 may be used to view the monitor tree (e.g., monitor tree 714 of FIG. 7) and its various tree nodes and the monitoring information associated with the each of the nodes (e.g., node 730 and the associated resource 726). A user may select any of the nodes or resources shown as part of the monitor tree to view the monitoring data. According to one embodiment, a color or symbol combination may be used to determine the status of associated resources at various nodes. For example, a red/green/yellow combination may be used wherein, if the associated resource 726 at the node 730 is in a "normal" state, a green mark may be shown next to it. If the associated resource 726 approaches a critical value, the mark may turn yellow and once the associated resource 726 reaches the critical value, the mark may turn red. Additionally, the mark may be of a different color, such as white, when there is inactivity associated with the associated resource 726. However, the underlying principles of the invention are not limited to any particular color scheme.

According to one embodiment, the monitor viewer 706 may be used to display other information related to the resources 720 including, for example, the name of the resource, the resource description, the resource type, relevant dates and/or time, resource properties and values. The information may also include data history regarding the resources 720. The data history may include, for example, values associated with the resource over different periods of time (e.g., over a minute, hour, day, . . . etc).

As mentioned above, according to one embodiment, an XML file 728 may be retrieved by the monitor service 702 from a central database 710 to generate a monitor tree 714. The XML file may include semantics and directives to generate the monitor tree using the monitor service 702. An XML parser may be used to parse the semantics and directives of the XML file. Furthermore, a Java Management Extensions (JMX)-based application programming interface (API) may be used to create and customize the monitor tree. The monitor API may facilitate and handle both (1) the creation of the monitor tree and (2) the customization of the monitor tree as will as the reporting of the monitoring information and values. Typically, an API refers to a language or message format used by an application program to communicate with the operating system, communications protocols, and/or with other control programs (e.g., database management systems).

Figure 9A:
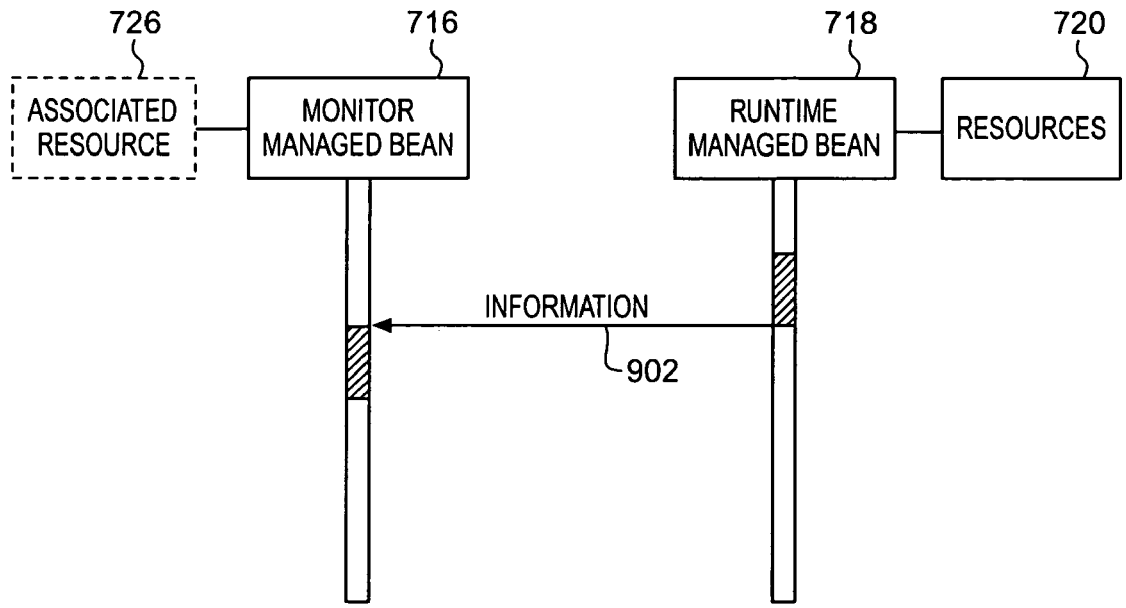
FIG. 9A is a block diagram illustrating an embodiment of a monitoring data transmission sequence.

FIG. 9A illustrates an embodiment of a monitoring data transmission sequence. As illustrated, a monitor managed bean 716 may receive monitoring information from a runtime managed bean 718. The monitor bean 716 may be associated with a particular resource 726 of the resources 720 being monitored. The runtime bean 718 may provide monitoring information 902 to the monitor bean 716 at a tree node 730 of the monitor tree 714. According to one embodiment, the runtime bean 718 may continuously provide such information 902 to the monitor bean 716, without receiving a request (or any other such indication or signal) from the monitor bean 716.

Figure 9B:
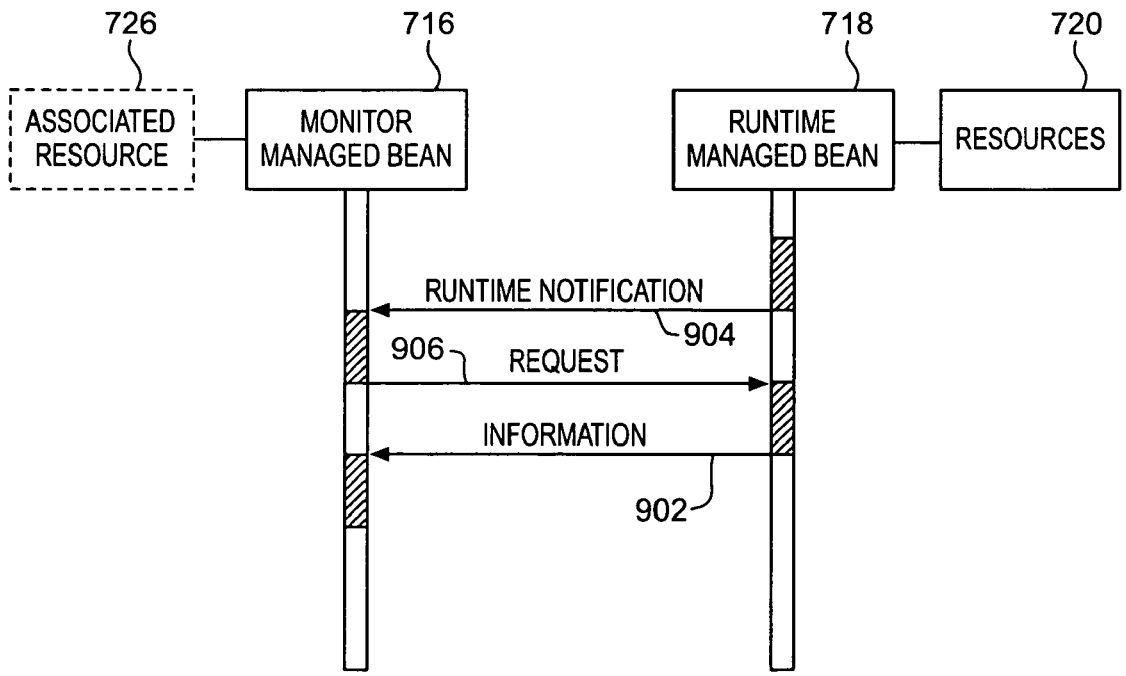
FIG. 9B is a block diagram illustrating an embodiment of a monitoring data transmission sequence.

FIG. 9B illustrates another embodiment of a monitoring data transmission sequence. As illustrated, in this embodiment, the runtime bean 718 may send a notification 904 to the monitor bean 716 related to the monitoring of the associated resource 726. For example, in one embodiment, the runtime bean 718 may transmit a notification upon detecting a specified event associated with its resource (e.g., such as the resource reaching a critical value). Upon receiving the notification 904 from the runtime bean 718, the monitor bean 716 may send a request 906 to the runtime bean 718, requesting the monitoring data. In response to the request 906, the runtime bean 718 may send the information 902 including monitoring data regarding the associated resource 726 to the monitor bean 716.

Figure 9C:
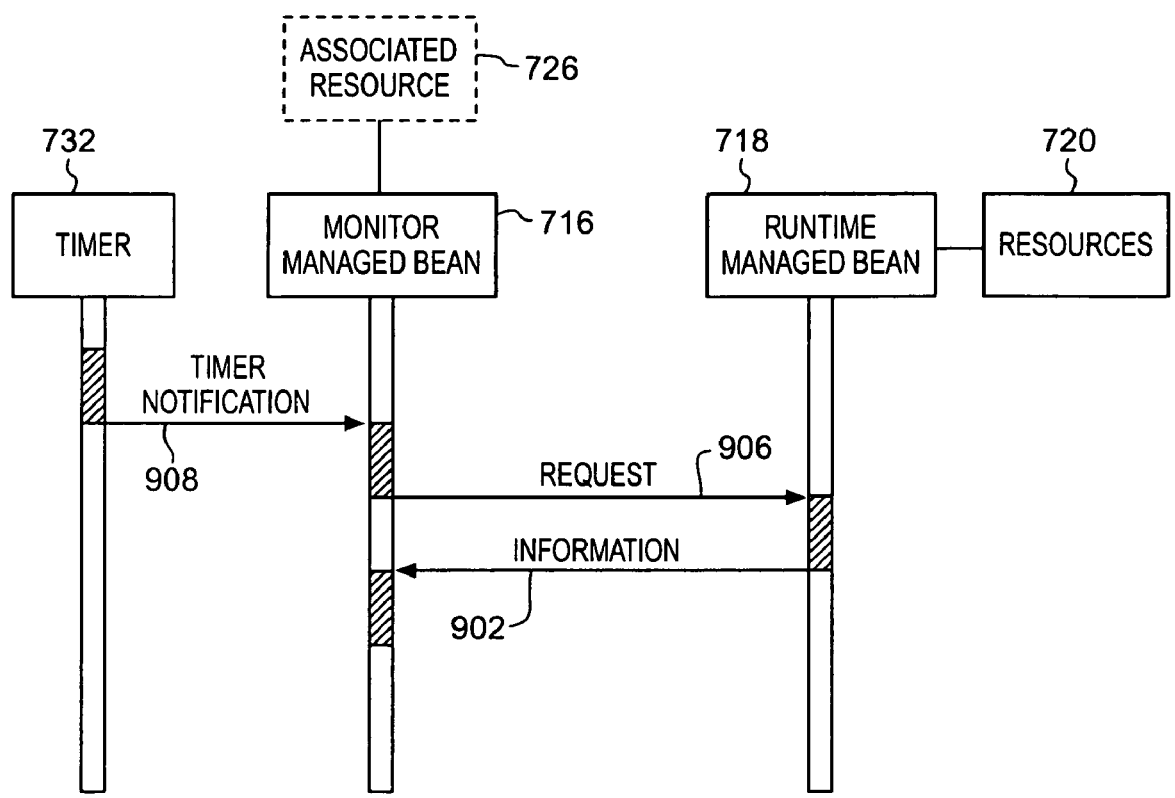
FIG. 9C is a block diagram illustrating an embodiment of a monitoring data transmission sequence.

FIG. 9C illustrate another embodiment of a monitoring data transmission sequence. As illustrated, in this embodiment, a timer 732 is configured to manage transmission of the monitoring data. The timer 732 may be in communication with a managed bean server 712 to help facilitate a timetable (or schedule or pattern) for transmitting the monitoring data. For example, the timer 732 may include a predetermined period of time after which the timer will signal to the monitor bean 716 to place a query with the runtime bean 718. Upon receiving the notification 908, the monitor bean 716 may send the request 906 to the runtime bean 718, requesting the monitoring data. In response to the request 906, the runtime bean 718 may provide the information 902 including the monitoring data regarding the associated resource 726 to the monitor bean 716.

Figure 10:
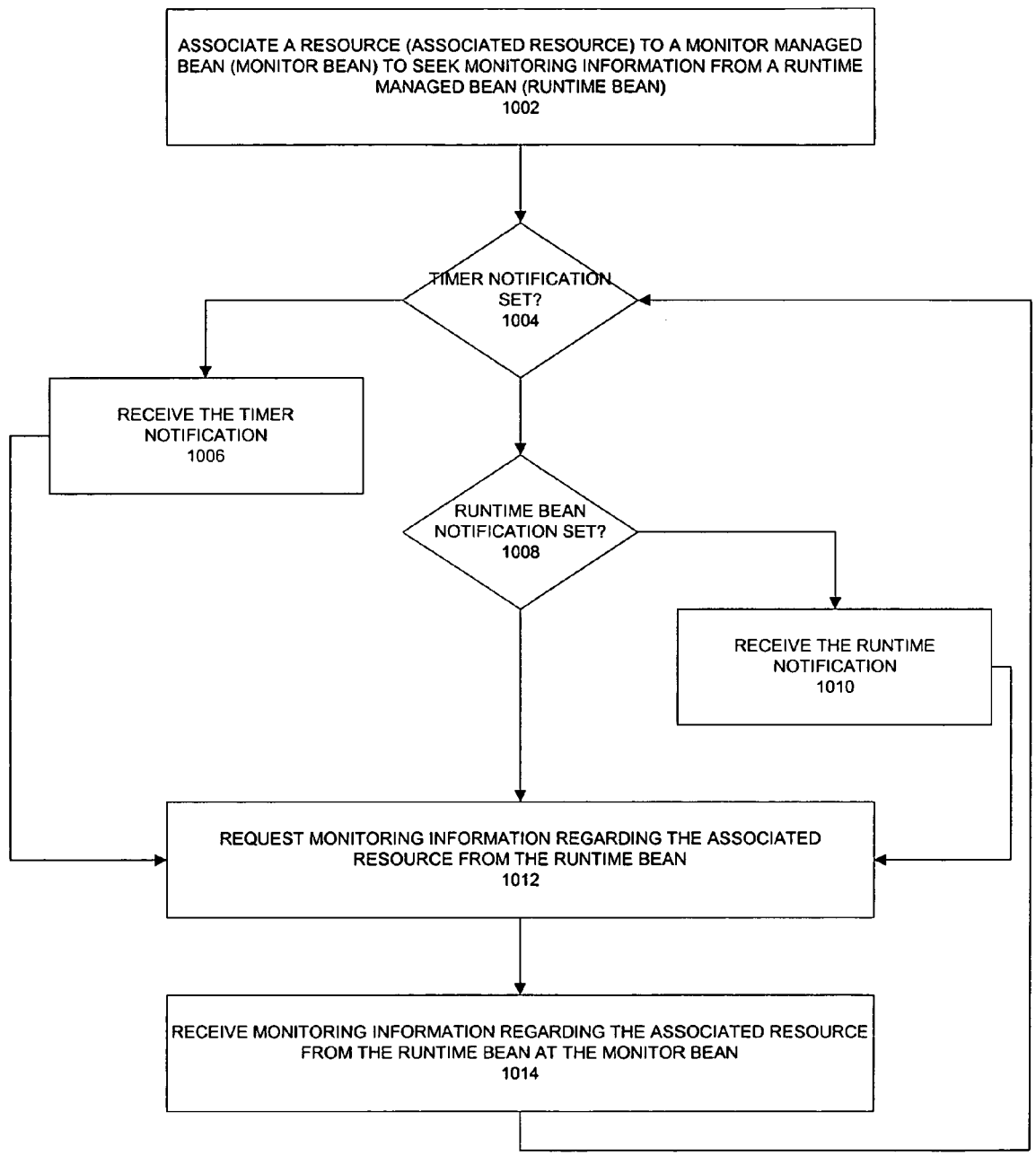
FIG. 10 is a flow diagram illustrating an embodiment of a process for monitoring of resources using a monitor tree.

FIG. 10 is a flow diagram illustrating an embodiment of a process for monitoring of resources using a monitor tree. First, according to one embodiment, at processing block 1002, a resource (associated resource) of the monitoring resources may be associated with a monitor managed bean at a node of a monitor tree so that monitoring information regarding the associated resource may be retrieved from runtime managed bean. The runtime managed bean may monitor one or more of the resources including Java resources associated with a Java 2 Platform, Enterprise Edition (J2EE) engine. As mentioned above, the Java resources may include, for example, kernel resources, services, interfaces, and libraries for each of the dispatcher and server associated with the J2EE engine. The Java resources may also include network connections, memory consumption, threads, classloaders, database connections, database transactions, HyperText Transport Protocol (HTTP) cache, Java Messaging Service (JMS) queries and topics, sessions, and the like.

At decision block 1004, it is determined whether timer notification service is being utilized. If the timer notification service is employed, the timer notification may be received at the monitor bean from the timer at processing block 1006. The request for the monitoring information regarding the associated resource may then be placed by the monitor bean with the runtime bean at processing block 1012. However, if the notification service is not employed, the process may continue with decision block 1008.

At decision block 1008, a determination is made as to whether a runtime bean notification service is used. As described above, if the runtime bean notification service is used, the runtime bean may provide a notification to the monitor bean in response to a specified event associated with the resource (e.g., when the monitored value reaches a threshold). Upon receiving the runtime notification, at processing block 1010, the monitor bean may request the monitoring data associated with the associated resource at processing block 1012.

With neither the timer notification service nor the runtime notification service is employed, the monitor bean may place a request with the runtime bean seeking the monitoring information regarding the associated resource at processing block 1012. The monitor bean may then receive such monitoring information from the runtime bean at processing block 1014. The process may then continue with processing block 1004.

Figure 11:
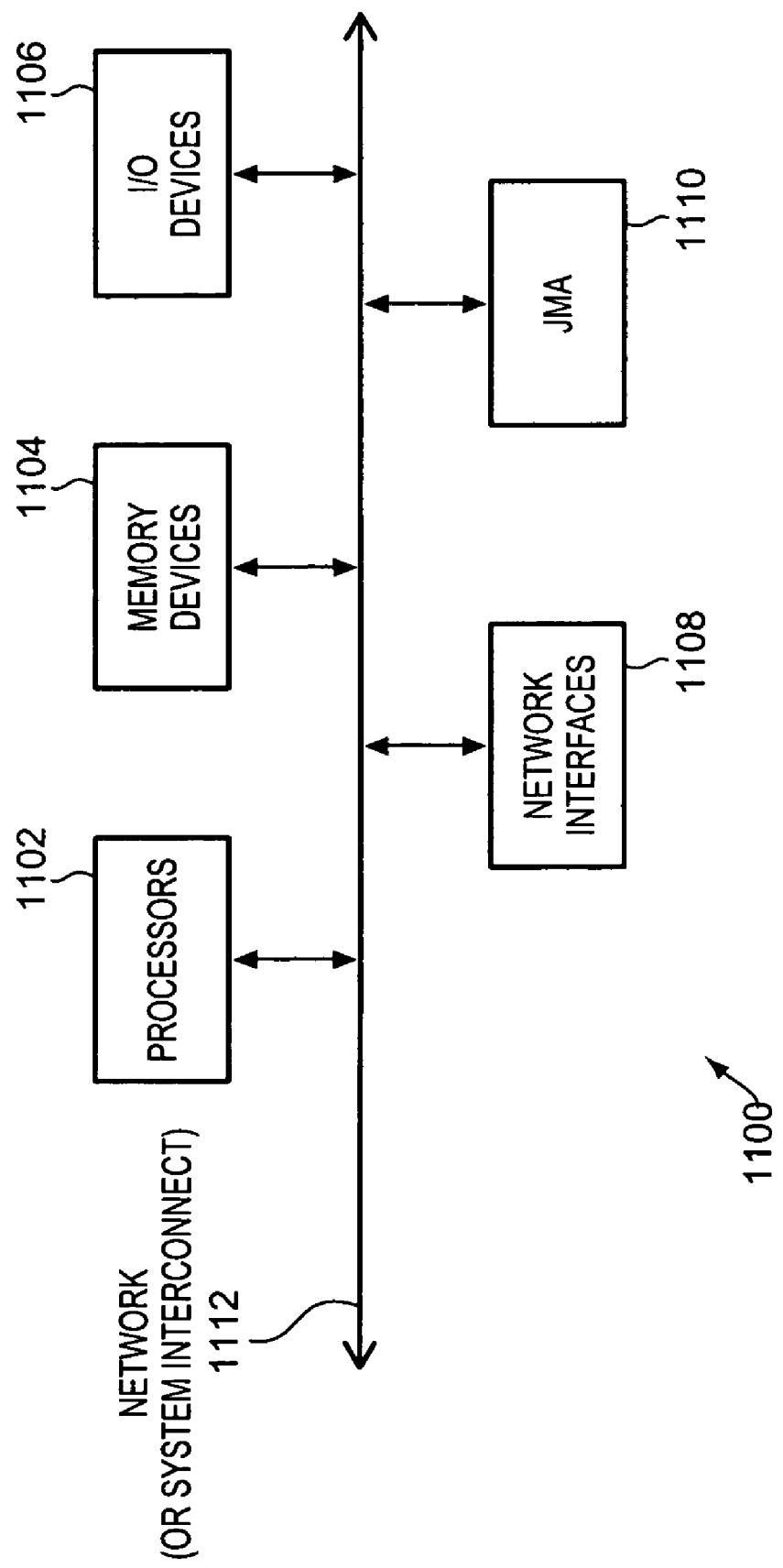
FIG. 11 is a block diagram illustrating an embodiment of a node implementation.

FIG. 11 is a block diagram illustrating an embodiment of a node implementation. According to one embodiment, the node 1100 may include one or more processors 1102 (e.g., processors 202-206 of FIG. 2), one or more memory devices 1104 (e.g., main memory 216 of FIG. 2), one or more Input/Output (I/O) devices 1106 (e.g., I/O devices 230 of FIG. 2), one or more network interfaces 1108, and Java monitoring system or architecture (JMA) 1110 (e.g., JMA 700 of FIG. 7), directly or indirectly, connected together through a system interconnect or network 1112. The processors 1102 may include microprocessors, microcontrollers, field programmable gate arrays (FPGAs), application specific integrated circuits (ASICs), central processing units (CPUs), programmable logic devices (PLDs), and similar devices that access instructions from a system storage (e.g., memory 1104), decode them, and execute those instructions by performing arithmetic and logical operations.

The JMA 1110 may include a monitor tree (e.g., monitor tree 714 of FIG. 7) used for monitoring of resources including Java resources associated with, for example, a Java 2 Platform, Enterprise Edition (J2EE) engine. Components for monitoring of the Java resources using the JMA 1110 may include executable content, control logic (e.g., ASIC, PLD, FPGA, etc.), firmware, or some combination thereof, in one embodiment of the present invention. In embodiments of the invention in which Java monitoring may include executable content, it may be stored in the memory device 1104 and executed by the control processor 1102.

Memory devices 1104 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory devices 1104 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 1104 may store program modules, such as routines, programs, objects, images, data structures, program data, and other program modules that perform particular tasks or implement particular abstract data types that facilitate system use.

The I/O devices 1106 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1112 may permit communication between the various elements of node 1100. System interconnects 1112 may include a wide variety of signal lines including one or more of memory buses, peripheral buses, local buses, host buses, and bridge, optical, electrical, acoustical, and other propagated signal lines.

Figure 12A:
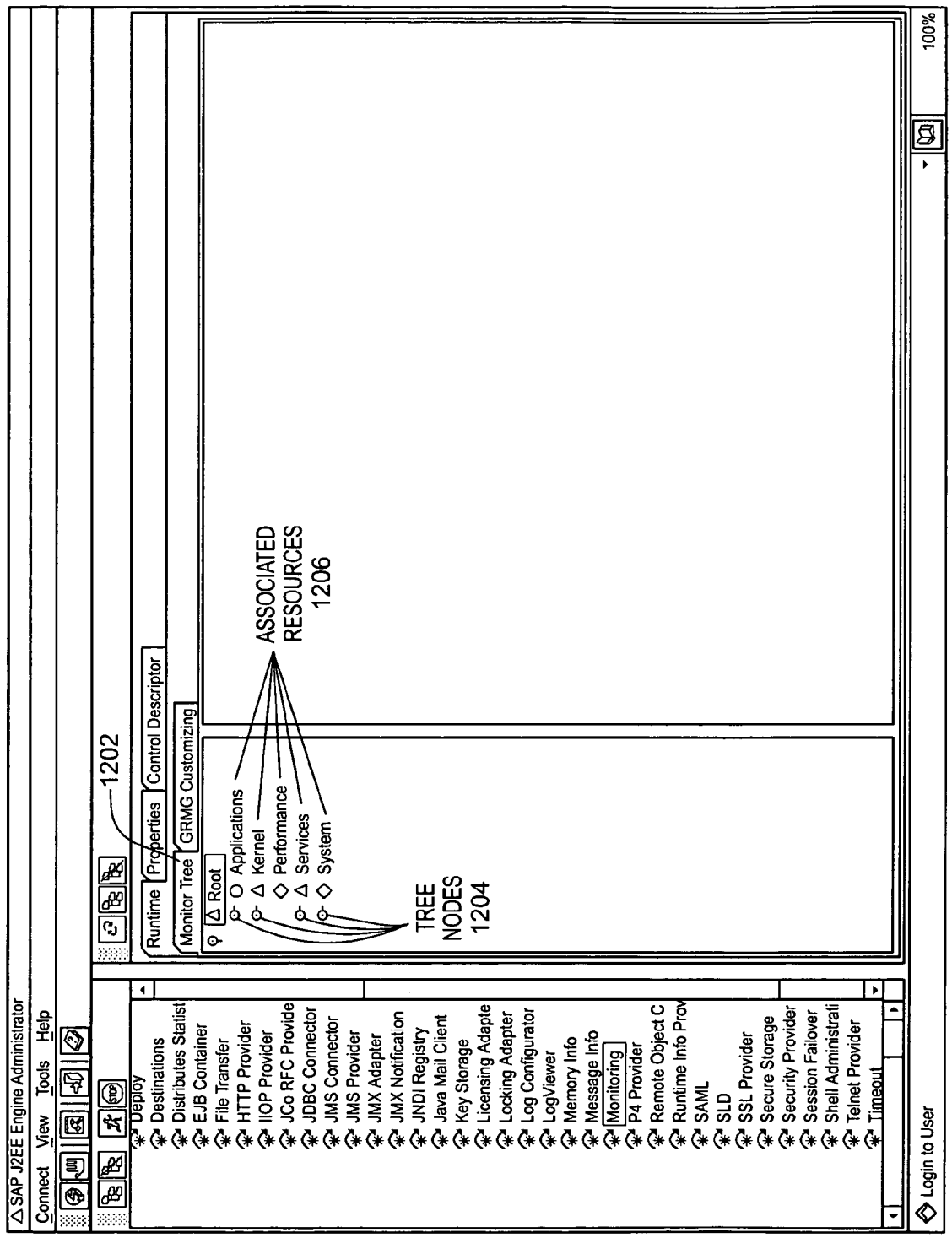
FIG. 12A is an exemplary illustration of a monitor tree using a monitor viewer according to one embodiment.

FIG. 12A is an exemplary illustration of a monitor tree as displayed within a monitor viewer, according to one embodiment. A monitor tree 1202 is illustrated having several nodes 1204. Each of the nodes 1204 is associated with a corresponding monitoring resource 1206 (e.g., applications, kernel, services, and system).

Figure 12B:
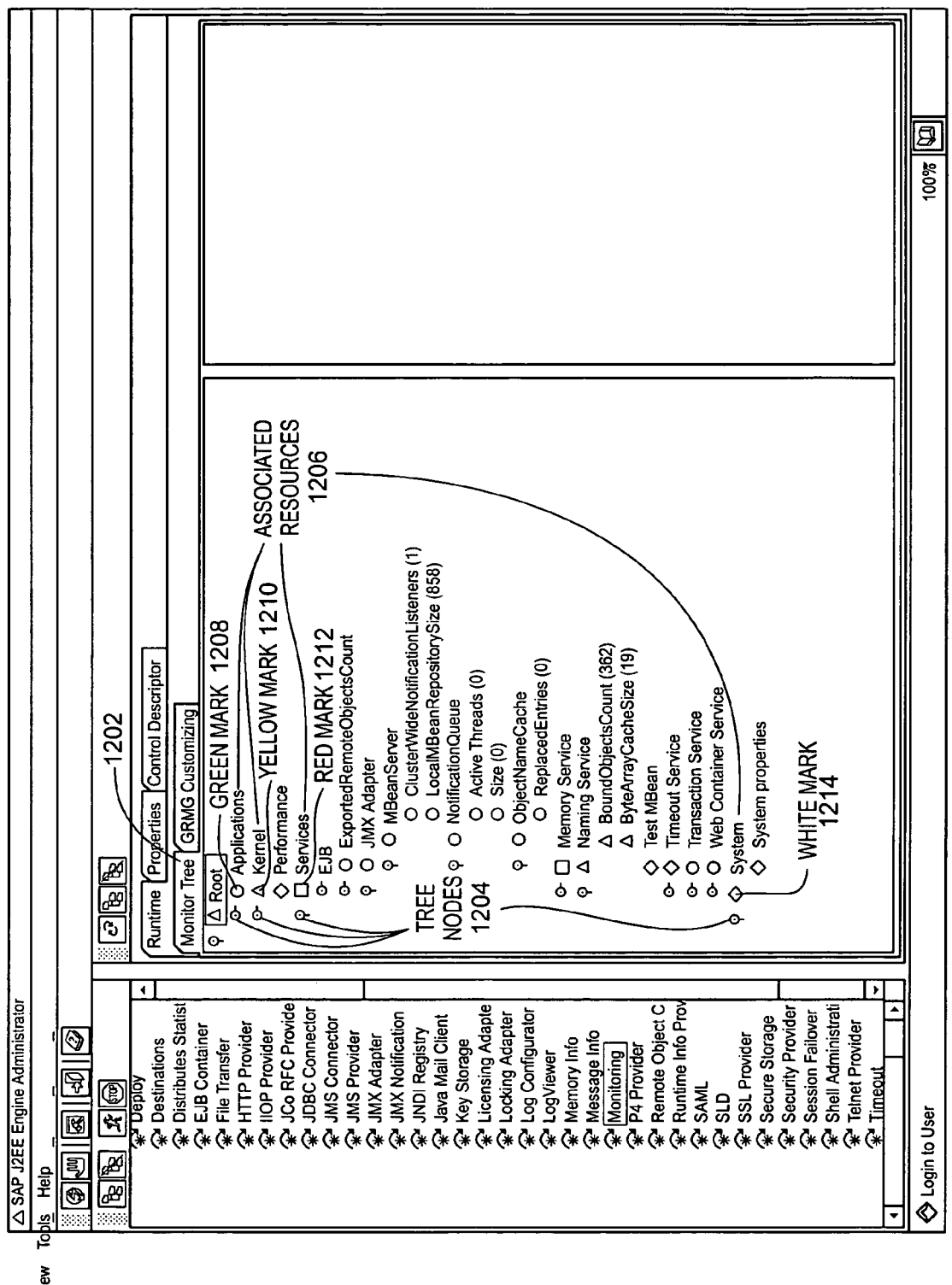
FIG. 12B is an exemplary illustration of a monitor tree using a monitor viewer according to one embodiment.

FIG. 12B is another view from within the monitor viewer according to one embodiment. As with FIG. 12A, a monitor tree 1202 is illustrated having several nodes 1204. Each of the nodes 1204 is associated with a corresponding monitoring resource 1206 (e.g., applications, kernel, services, and system). Further, various colors marks 1208-1214 representing corresponding status of the resources 1206 are illustrated here as different symbols.

For example, the green mark 1208, represented here as a circle, may indicate monitoring of the corresponding resource. The yellow mark 1210, represented here as a triangle, may indicate continuous monitoring of the corresponding resource and/or may indicate that the resource being monitored is close to a critical value or stage. The red mark 1212, represented here as a square, may indicate that the corresponding resource has reached a critical value. Finally, the white mark 1214, represented here as a diamond, may indicate inactivity or that the corresponding resource is not being monitored.

Figure 13A:
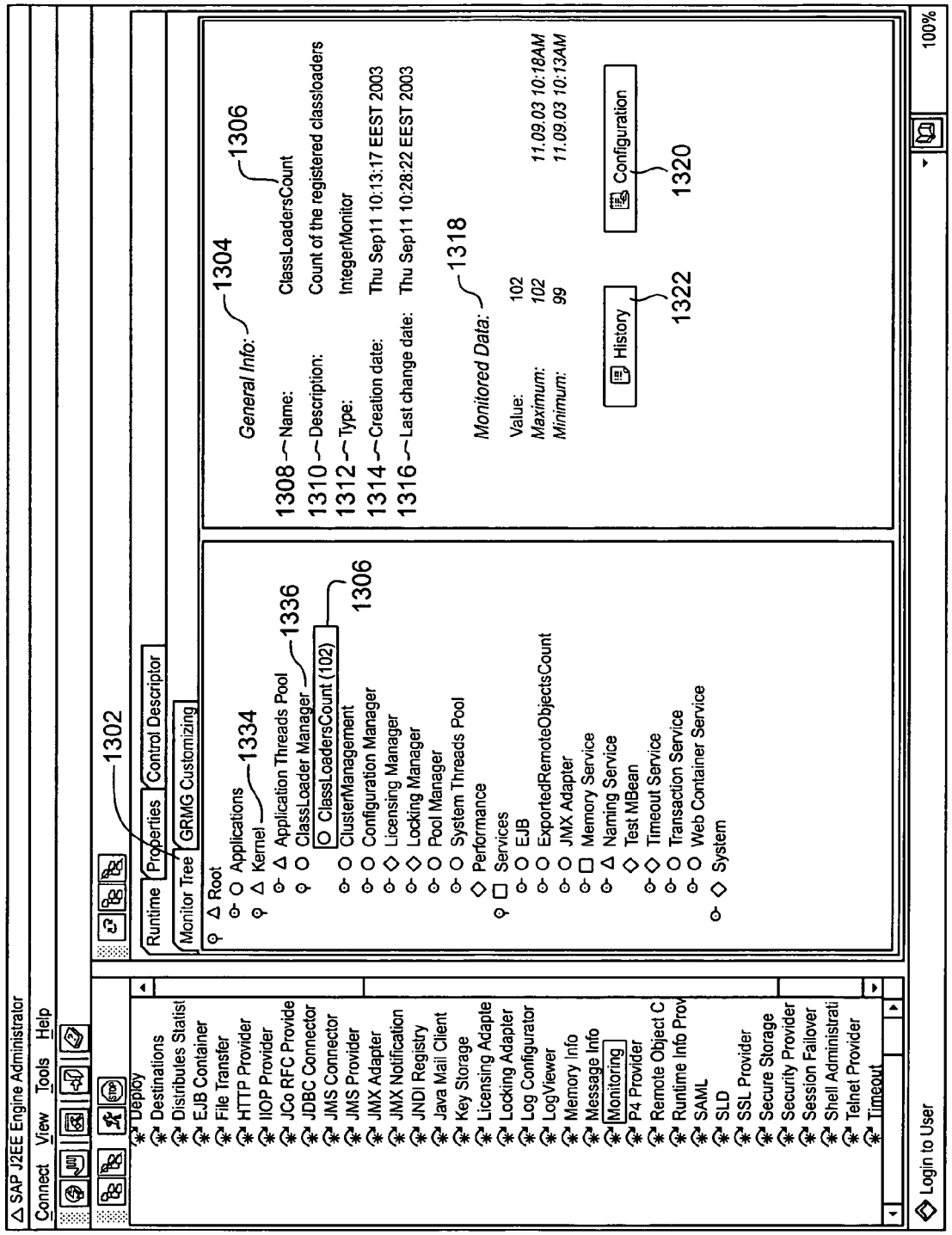
FIG. 13A is an exemplary illustration of a monitor tree using a monitor viewer according to one embodiment.

FIG. 13A is another exemplary illustration a monitor viewer according to one embodiment. As described with reference to FIGS. 12A-12C, the monitor tree 1302 includes various tree nodes and their associated resources, such as the kernel 1334. According to one embodiment, the monitor viewer may be used to view general information 1304 relating to any of the resources and their subcategories. For example, the general information 1304 regarding the Kernel/ClassLoader Manager/ClassLoadersCount 1334, 1336, 1306 may include the name 1308, description 1310, type 1312, creation date 1314, last change date 1316, and other monitoring data 1318. The selection under general information 1304 may also include information relating to monitor configuration 1320 and monitor history 1322.

Figure 13B:
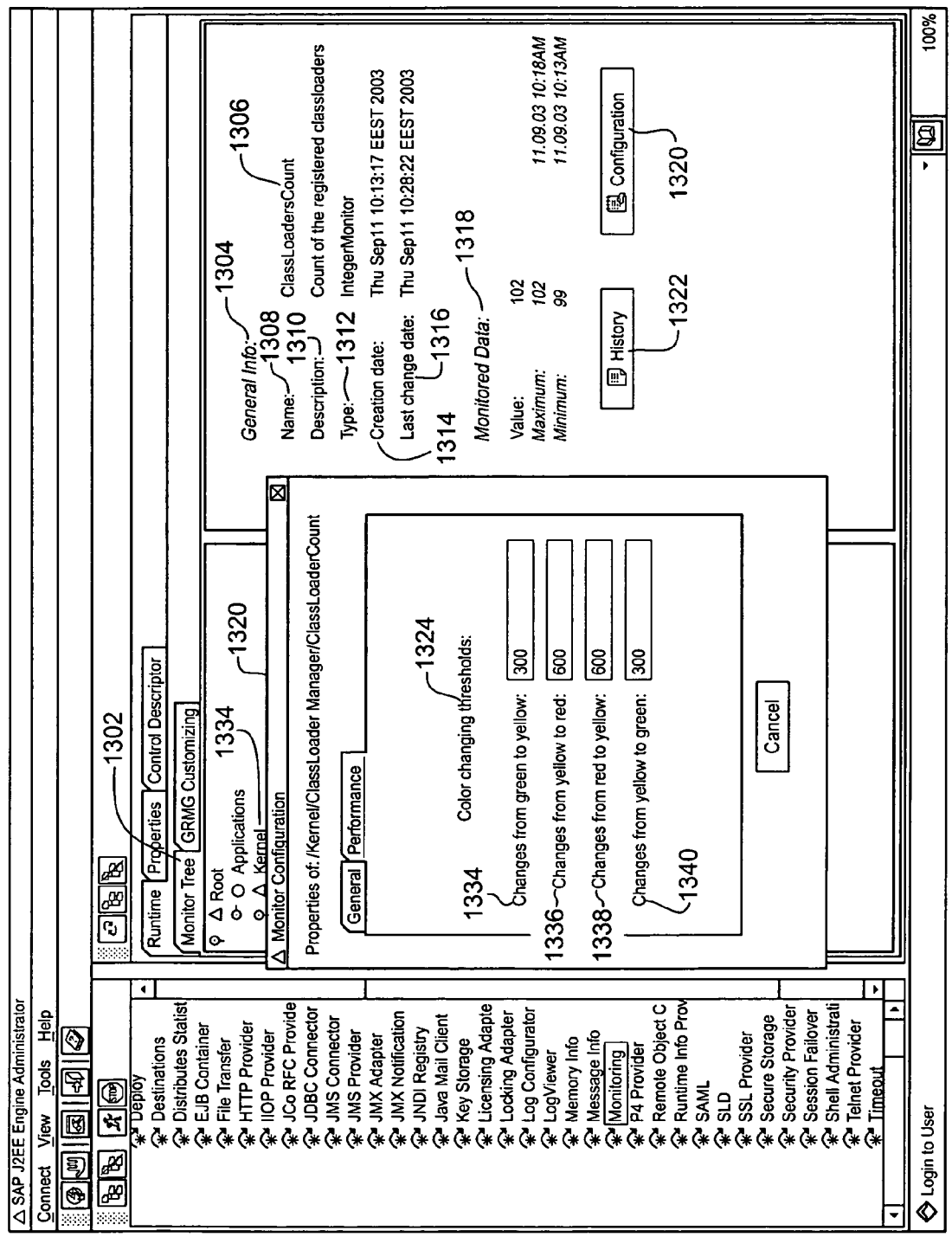
FIG. 13B is an exemplary illustration of a monitor tree using a monitor viewer according to one embodiment.

FIG. 13B is another exemplary illustration of a monitor viewer according to one embodiment. As described with reference to FIG. 13A, the general information 1304 may include information relating to monitor configuration 1320 as it relates to the properties of Kernel/ClassLoader Manager/ClassLoadersCount 1334, 1336, 1306. The monitor configuration 1320 may include various color changing thresholds 1324 including, for example, changes from green to yellow 1334, changes from yellow to red 1336, changes from red to yellow 1338, and changes from yellow from green 1340.

Figure 13C:
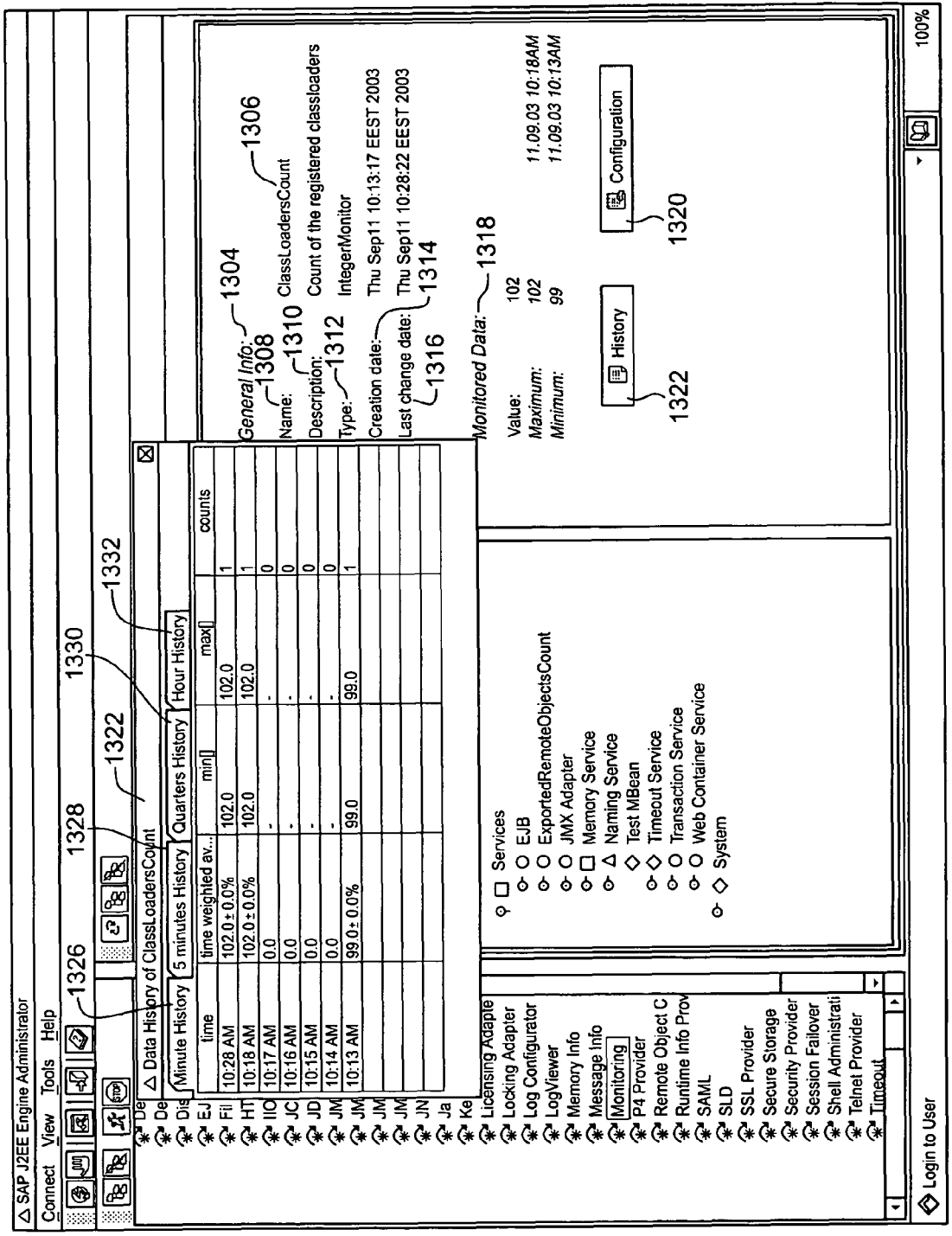
FIG. 13C is an exemplary illustration of a monitor tree using a monitor viewer according to one embodiment.

FIG. 13C is another exemplary illustration of a monitor viewer according to one embodiment. As described with reference to FIG. 13A, the general information 1304 may include information relating to monitor history 1322 as it relates to the properties of Kernel/ClassLoader Manager/ClassLoadersCount 1334, 1336, 1306. The monitor history 1322 may include monitoring data history relating to ClassLoadersCount 1322 for various time periods 1326-1332. The various time periods 1326-1332 may include the minute history 1326, the five-minute history 1328, the quarter or fifteen-minute history 1330, and the hour history 1332. It is contemplated that the monitor history 1322 may include other time periods, such as a thirty-minute history, a two-hour history, and the like.

In one embodiment of the invention, the management techniques which are the focus of this application are used to manage resources within a cluster of server nodes. An exemplary application server architecture will now be described, followed by a detailed description of the management architecture and associated processes.

Figure 14:
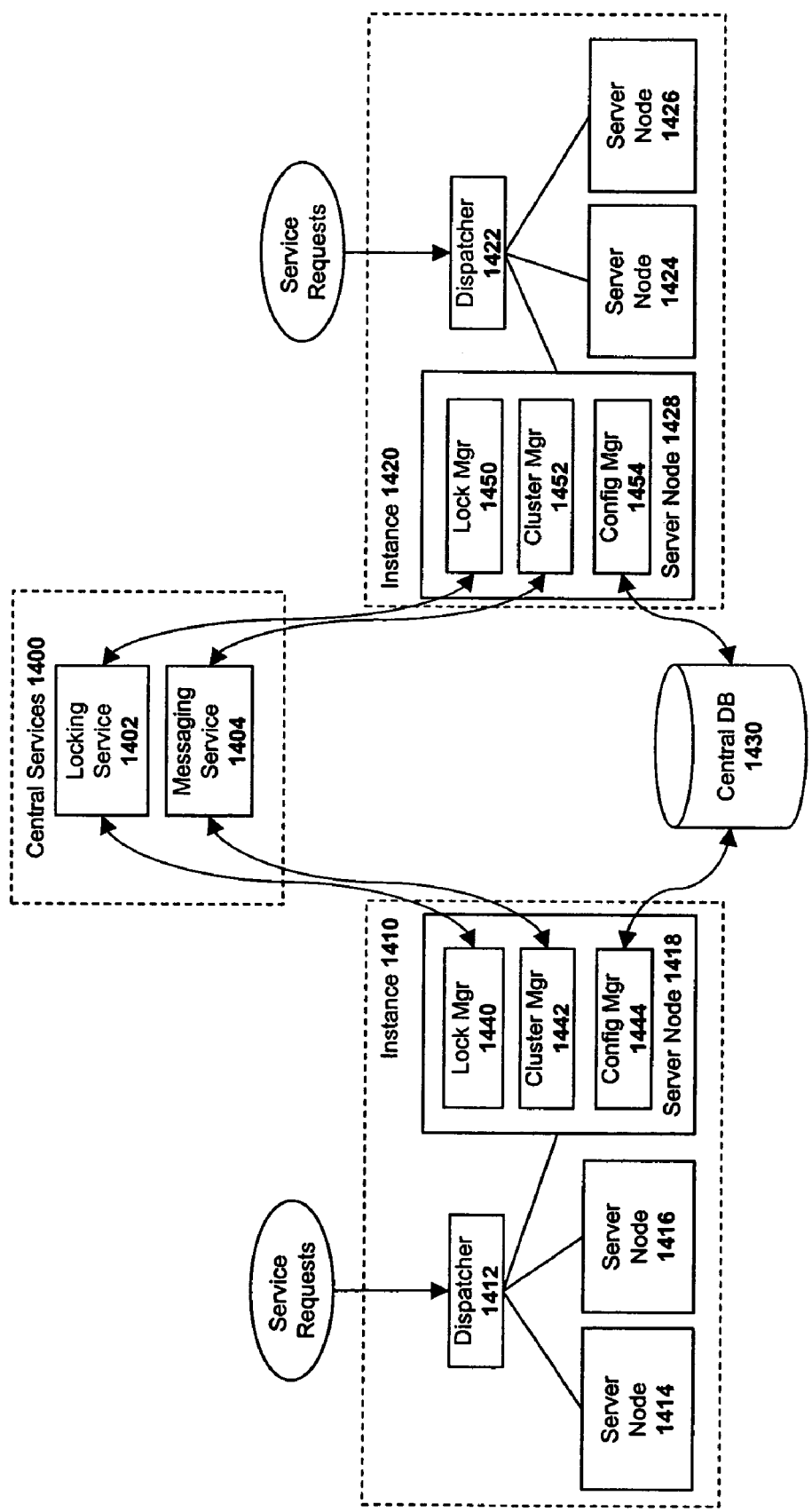
FIG. 14 is a block diagram illustrating an embodiment of an application server architecture.

An application server architecture employed in one embodiment of the invention is illustrated in FIG. 14. The architecture includes a central services "instance" 1400 and a plurality of application server "instances" 1410, 1420. As used herein, the application server instances, 1410 and 1420, each include a group of server nodes 1414, 1416, 1418 and 1424, 1426, 1428, respectively, and a dispatcher, 1412, 1422, respectively. The central services instance 1400 includes a locking service 1402 and a messaging service 1404 (described below). The combination of all of the application instances 1410, 1420 and the central services instance 1400 is referred to herein as a "cluster." Although the following description will focus solely on instance 1410 for the purpose of explanation, the same principles apply to other instances such as instance 1420.

The server nodes 1414, 1416, 1418 within instance 1410 provide the business and/or presentation logic for the network applications supported by the system. Each of the server nodes 1414, 1416, 1418 within a particular instance 1410 may be configured with a redundant set of application logic and associated data. In one embodiment, the dispatcher 1412 distributes service requests from clients to one or more of the server nodes 1414, 1416, 1418 based on the load on each of the servers. For example, in one embodiment, a dispatcher implements a round-robin policy of distributing service requests (although various alternate load balancing techniques may be employed).

In one embodiment of the invention, the server nodes 1414, 1416, 1418 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of the instances 1410, 1420 is enabled via the central services instance 1400. As illustrated in FIG. 14, the central services instance 1400 includes a messaging service 1404 and a locking service 1402. The message service 1404 allows each of the servers within each of the instances to communicate with one another via a message passing protocol. For example, messages from one server may be broadcast to all other servers within the cluster via the messaging service 1404. In addition, messages may be addressed directly to specific servers within the cluster (i.e., rather than being broadcast to all servers).

In one embodiment, the locking service 1402 disables access to (i.e., locks) certain specified portions of configuration data and/or program code stored within a central database 1430. A locking manager 1440, 1450 employed within the server nodes locks data on behalf of various system components which need to synchronize access to specific types of data and program code (e.g., such as the configuration managers 1444, 1454 illustrated in FIG. 14). As described in detail below, in one embodiment, the locking service 1402 enables a distributed caching architecture for caching copies of server/dispatcher configuration data.

In one embodiment, the messaging service 1404 and the locking service 1402 are each implemented on dedicated servers. However, the messaging service 1404 and the locking service 1402 may be implemented on a single server or across multiple servers while still complying with the underlying principles of the invention.

As illustrated in FIG. 14, each server node (e.g., 1418, 1428) includes a lock manager 1440, 1450 for communicating with the locking service 1402; a cluster manager 1442, 1452 for communicating with the messaging service 1404; and a configuration manager 1444, 1454 for communicating with a central database 1430 (e.g., to store/retrieve configuration data). Although the lock manager 1440, 1450, cluster manager 1442, 1452 and configuration manager 1444, 1454 are illustrated with respect to particular server nodes, 1418 and 1428, in FIG. 14, each of the server nodes 1414, 1416, 1424 and 1426 and/or on the dispatchers 1412, 1422 may be equipped with equivalent lock managers, cluster managers and configuration managers.

Figure 15:
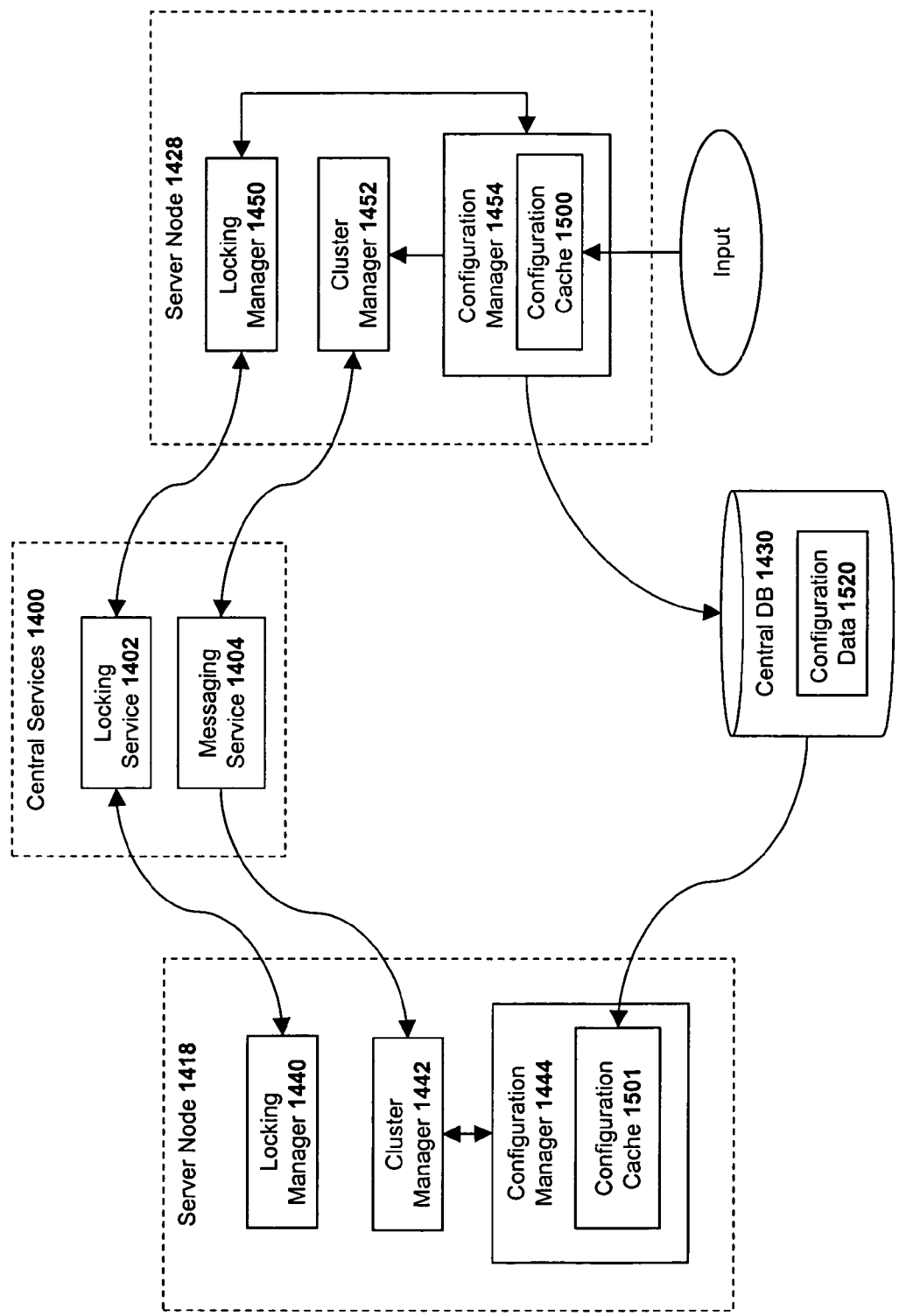
FIG. 15 is a block diagram illustrating an embodiment of an application server architecture.

Referring now to FIG. 15, in one embodiment, configuration data 1520 defining the configuration of the central services instance 1400 and/or the server nodes and dispatchers within instances 1410 and 1420, is stored within the central database 1430. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc); information related to the network management configuration for each server/dispatcher (e.g., as described below); and various other types of information related to the cluster.

In one embodiment of the invention, to improve the speed at which the servers and dispatchers access the configuration data, the configuration managers 1444, 1454 cache configuration data locally within configuration caches 1500, 1501. As such, to ensure that the configuration data within the configuration caches 1500, 1501 remains up-to-date, the configuration managers 1444, 1454 may implement cache synchronization policies.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

The invention claimed is:

1. A method for monitoring one or more resources by a monitoring architecture, the method comprising:
    assigning each of a plurality of runtime beans to the respective one or more of a plurality of resources to be monitored, wherein each of the plurality of runtime beans to provide monitoring information regarding each of the respective one or more resources to a monitor bean associated with the runtime bean assigned to the respective resource, the monitor bean being one of a plurality of monitor beans in the monitoring architecture;
    arranging the plurality of monitor beans into a hierarchical tree structure, wherein each of the monitor beans to receive the monitoring information regarding the resource to be monitored from the runtime bean assigned to the monitor bean, and wherein each of the plurality of monitor beans in the hierarchical tree structure to be individually represented as a tree node of the hierarchical tree structure;
    continuous monitoring, in real-time, the plurality of resources via the plurality of runtime beans respectively assigned to the plurality of resources;
    registering the monitor beans as a cluster by a server of the monitoring architecture, wherein the server to serve as a single point of entry for calling each of the plurality of runtime and monitor beans; and
    receiving by the server of the monitoring architecture the continuous monitoring information from the plurality of runtime beans at predetermined periodic time periods, wherein the tree node associated with each monitor bean within the hierarchical tree structure provides individual reporting of the corresponding resource based on the monitoring information received by the monitor bean represented by the tree node,
    wherein the monitoring information includes a current monitoring status and a monitoring history of the plurality of resources, wherein the current monitoring status includes a color-coded indication of at least one of status of a resource being monitored among the plurality of resources, wherein the color-coded indication indicates whether the resource is being continuously monitored.

2. The method of claim 1, further comprising:
    receiving a notification from the runtime beans signaling availability of the monitoring information; and
    requesting the monitoring information from the runtime beans in response to receiving the notification.

3. The method of claim 1, further comprising:
    receiving a timer notification from a timer indicating availability of the monitoring information; and
    requesting the monitoring information from the runtime beans in response to receiving the timer notification, wherein the timer notification is based on the predetermined time periods.

4. The method of claim 1, wherein the plurality of resources include one or more of Advanced Business Application Programming (ABAP) resources associated with an ABAP engine, Java resources associated with a Java 2 Platform Enterprise Edition (J2EE) engine, kernel service resources, kernel interface resources, and kernel library resources.

5. The method of claim 1, further comprising communicatively interfacing the hierarchical tree structure with a central database and one or more client-level applications using a monitor service.

6. The method of claim 1, further comprising displaying the monitoring information via a monitor viewer.

7. The method of claim 6, wherein the monitor viewer includes one or more of a customized visual administrator monitor viewer, a Web-based monitor viewer, and a Graphical User Interface (GUI)-based monitor viewer.

8. The method of claim 1, wherein the wherein the color-coded indication further indicates the resource is nearing a specified event.

9. The method of claim 1, wherein the monitoring history includes monitoring history of the plurality of resources that is collected over a predetermined time period.

10. A monitoring system comprising:
    an application server having a processor and a storage medium coupled with the processor via a bus, the application server to:

assign each of a plurality of runtime beans to a respective one or more of a plurality of resources to be monitored, wherein each of the plurality of runtime beans to provide monitoring information regarding each of the respective one or more resources to a monitor bean associated with the runtime bean assigned to the resource, the monitor bean being one of a plurality of monitor beans communicably interfaced with the application server;

arrange the plurality of monitor beans into a hierarchical tree structure, wherein each of the monitor beans to receive the monitoring information regarding the resource to be monitored from the runtime bean assigned to the monitor bean, and wherein each of the plurality of monitor beans in the hierarchical tree structure to be individually represented as a tree node of the hierarchical tree structure;

continuously monitor, in real-time, the plurality of resources via the plurality of runtime beans respectively assigned to the plurality of resources;

register the monitor beans as a cluster by a server of the monitoring architecture, wherein the server to serve as a single point of entry for calling each of the plurality of runtime and monitor beans; and receive the continuous monitoring information from the plurality of runtime beans at predetermined periodic time periods, wherein the tree node associated with each monitor bean within the hierarchical tree structure provides individual reporting of the corresponding resource based on the monitoring information received by the monitor bean represented by the tree node, wherein the monitoring information includes a current monitoring status and a monitoring history of the plurality of resources, wherein the current monitoring status includes a color-coded indication of at least one of status of a resource being monitored among the plurality of resources, wherein the color-coded indication indicates whether the resource is being continuously monitored.

11. The system of claim 10, wherein the application server is further to communicably interface the hierarchical tree structure with a central database and one or more client-level applications using a monitor service.

12. The system of claim 11, wherein the one or more client-level applications include one or more of a computing center management system, administrative tools, and third party tools.

13. The system of claim 10, wherein the administrative tools include a monitor viewer to display the monitoring information, wherein the monitor viewer includes a customized visual administrator monitor viewer, a Web-based monitor viewer, and a Graphical User Interface (GUI) based monitor viewer.

14. A machine-readable storage medium having instructions stored thereon which, when executed, cause a machine to perform a method, for monitoring one or more resources, the method comprising:

assigning each of a plurality of runtime beans to the respective one or more of a plurality of resources to be monitored, wherein each of the plurality of runtime beans to provide monitoring information regarding each of the respective one or more resources to a monitor bean associated with the runtime bean assigned to the resource, the monitor bean being one of a plurality of monitor beans communicably interfaced with the machine;

arranging the plurality of monitor beans into a hierarchical tree structure, wherein each of the monitor beans to receive the monitoring information regarding the resource to be monitored from the runtime bean assigned to the monitor bean, and wherein each of the plurality of monitor beans in the hierarchical tree structure to be individually represented as a tree node of the hierarchical tree structure;

continuous monitoring, in real-time, the plurality of resources via the plurality of runtime beans respectively assigned to the plurality of resources;

registering the monitor beans as a cluster by a server of the monitoring architecture, wherein the server to serve as a single point of entry for calling each of the plurality of runtime and monitor beans; and receiving the continuous monitoring information from the plurality of runtime beans at predetermined periodic time periods, wherein the tree node associated with each monitor bean within the hierarchical tree structure provides individual reporting of the corresponding resource based on the monitoring information received by the monitor bean represented by the tree node, wherein the monitoring information includes a current monitoring status and a monitoring history of the plurality of resources, wherein the current monitoring status includes a color-coded indication of at least one of status of a resource being monitored among the plurality of resources, wherein the color-coded indication indicates whether the resource is being continuously monitored.

15. The machine-readable storage medium of claim 14, wherein the instructions which, when executed, further cause the machine to perform the method comprising:

receiving a notification from the runtime beans signaling availability of the monitoring information; and requesting the monitoring information from the runtime beans in response to receiving the notification, wherein the notification is based on the predetermined time periods.

16. The machine-readable storage medium of claim 14, wherein the instructions which, when executed, further cause the machine to perform the method comprising:

receiving a timer notification from a timer indicating availability of the monitoring information; and requesting the monitoring information from the runtime beans in response to receiving the timer notification, wherein the timer notification is based on the predetermined time periods.

17. The machine-readable storage medium of claim 14, wherein the instructions which, when executed, further cause the machine to perform the method comprising:

displaying the monitoring information via a monitor viewer.

18. The machine-readable storage medium of claim 17, wherein the monitor viewer includes one or more of a customized visual administrator monitor viewer, a Web-based monitor viewer, and a Graphical User Interface (GUI) based monitor viewer.

19. The machine-readable storage medium of claim 14, wherein each of the plurality of monitor beans in the hierarchical tree structure represented as a tree node of the hierarchical tree structure to individually report the monitoring information regarding the resource to be monitored from the runtime bean associated with the monitor bean.

20. The system of claim 10, wherein each of the plurality of monitor beans in the hierarchical tree structure represented as a tree node of the hierarchical tree structure to individually report the monitoring information regarding the resource to be monitored from the runtime bean associated with the monitor bean.

21. The method of claim 1 further comprising:
retrieving a file having semantics and directives, wherein the semantics and directives for arranging the plurality of monitor beans into the hierarchical tree structure.

22. The method of claim 1 further comprising:
communicating the continuous monitoring information to a visual administrator for display.

23. The system of claim 10, wherein the application server to retrieve a file having semantics and directives, wherein the semantics and directives for arranging the plurality of monitor beans into the hierarchical tree structure.

24. The system of claim 10, wherein the application server to communicate the continuous monitoring information to a visual administrator for display.

25. The machine-readable storage medium of claim 14, wherein the instructions which, when executed, further cause the machine to perform the method comprising:
retrieving a file having semantics and directives, wherein the semantics and directives for arranging the plurality of monitor beans into the hierarchical tree structure.

26. The machine-readable storage medium of claim 14, wherein the instructions which, when executed, further cause the machine to perform the method comprising:
communicating the continuous monitoring information to a visual administrator for display.

\* \* \* \* \*